(12) United States Patent
Magee

(10) Patent No.: US 10,538,280 B2
(45) Date of Patent: Jan. 21, 2020

(54) WHEEL FAIRING REDUCING VEHICLE DRAG

(71) Applicant: Garth L. Magee, Hawthorne, CA (US)

(72) Inventor: Garth L. Magee, Hawthorne, CA (US)

( * ) Notice: Subject to any disclaimer, the term of this patent is extended or adjusted under 35 U.S.C. 154(b) by 125 days.

(21) Appl. No.: 15/593,996

(22) Filed: May 12, 2017

(65) Prior Publication Data

US 2017/0247065 A1    Aug. 31, 2017

Related U.S. Application Data

(63) Continuation of application No. 13/799,005, filed on Mar. 13, 2013, now Pat. No. 9,878,745.

(Continued)

(51) Int. Cl.
| | |
|---|---|
| *B60B 7/00* | (2006.01) |
| *B62D 35/00* | (2006.01) |
| *B60B 3/08* | (2006.01) |
| *B60B 3/10* | (2006.01) |
| *B60C 11/03* | (2006.01) |
| *B60B 1/00* | (2006.01) |
| *B60B 1/02* | (2006.01) |
| *B60B 1/04* | (2006.01) |
| *B60B 1/06* | (2006.01) |
| *B60B 3/00* | (2006.01) |
| *B60C 11/11* | (2006.01) |
| *B62D 25/18* | (2006.01) |
| *B60C 19/00* | (2006.01) |

(Continued)

(52) U.S. Cl.
CPC ............. *B62D 35/00* (2013.01); *B60B 1/00* (2013.01); *B60B 1/003* (2013.01); *B60B 1/02* (2013.01); *B60B 1/0246* (2013.01); *B60B 1/0261* (2013.01); *B60B 1/041* (2013.01); *B60B 1/06* (2013.01); *B60B 3/007* (2013.01); *B60B 3/08* (2013.01); *B60B 3/10* (2013.01); *B60B 7/0006* (2013.01); *B60B 7/0066* (2013.01); *B60C 11/03* (2013.01); *B60C 11/0302* (2013.01); *B60C 11/0306* (2013.01); *B60C 11/0327* (2013.01); *B60C 11/11* (2013.01); *B62D 25/18* (2013.01); *B60B 3/00* (2013.01); *B60B 3/02* (2013.01); *B60B 7/00* (2013.01); *B60B 2900/1216* (2013.01); *B60C 19/00* (2013.01); *B60C 2011/0337* (2013.01); *B60C 2200/10* (2013.01); *B60C 2200/14* (2013.01); *B60Y 2200/13* (2013.01); *B62D 35/005* (2013.01); *B63B 1/322* (2013.01); *B64C 1/0009* (2013.01); *B64C 31/028* (2013.01); *Y02T 10/88* (2013.01); *Y10T 29/49492* (2015.01)

(58) Field of Classification Search
CPC .............................................. B60B 2900/1216
See application file for complete search history.

(56) References Cited

U.S. PATENT DOCUMENTS

| | | | | |
|---|---|---|---|---|
| 1,523,263 | A * | 1/1925 | Henninger | B62D 35/00 |
| | | | | 296/181.5 |
| 4,838,194 | A * | 6/1989 | Williamson | B60F 3/00 |
| | | | | 244/101 |

(Continued)

*Primary Examiner* — Charlie Y Peng

(57) ABSTRACT

A minimal fairing apparatus minimally shielding the faster-moving drag-sensitive uppermost wheel surfaces from headwinds reduces overall vehicle drag. The apparatus includes various upper wheel fairings of FIGS. 1-6. Each fairing shields a primary vehicle-drag-inducing upper wheel surface from headwinds otherwise impinging thereon.

49 Claims, 19 Drawing Sheets

Related U.S. Application Data

(60) Provisional application No. 61/745,357, filed on Dec. 21, 2012.

(51) Int. Cl.
  *B60B 3/02* (2006.01)
  *B63B 1/32* (2006.01)
  *B64C 1/00* (2006.01)
  *B64C 31/028* (2006.01)

(56) References Cited

U.S. PATENT DOCUMENTS

| | | | | |
|---|---|---|---|---|
| 5,056,860 | A | * | 10/1991 | Cornacchia ............ B62D 15/02 280/762 |
| 5,267,767 | A | * | 12/1993 | Farrow .................... B62J 17/02 224/316 |
| 6,017,076 | A | * | 1/2000 | Belisle .................... B62J 17/00 280/728.1 |
| D612,781 | S | * | 3/2010 | Harrell, Jr. .................. D12/186 |
| 8,814,253 | B1 | * | 8/2014 | Butler .................. B62D 25/163 296/180.4 |
| 2004/0212169 | A1 | * | 10/2004 | Takemura ................ B62J 15/02 280/152.1 |
| 2006/0192374 | A1 | * | 8/2006 | Belisle .................... B62J 27/00 280/748 |
| 2008/0023242 | A1 | * | 1/2008 | Lachapelle ............. B62J 15/00 180/210 |
| 2008/0150314 | A1 | * | 6/2008 | Van Der Westhuizen .................. B62J 15/00 296/78.1 |
| 2009/0256329 | A1 | * | 10/2009 | Sather .................... B62K 13/02 280/204 |
| 2011/0074129 | A1 | * | 3/2011 | Yokoyama ........... B62K 25/283 280/124.128 |
| 2011/0080019 | A1 | * | 4/2011 | Castillo .................. B62D 25/16 296/180.1 |
| 2011/0304129 | A1 | * | 12/2011 | Owens .................. B62D 25/16 280/849 |
| 2013/0096781 | A1 | * | 4/2013 | Reichenbach ......... B60Q 1/326 701/49 |
| 2013/0334869 | A1 | * | 12/2013 | Kronemeyer ............. B60B 7/06 301/37.102 |
| 2017/0349224 | A1 | * | 12/2017 | Logounov ............ B62D 35/001 |

* cited by examiner

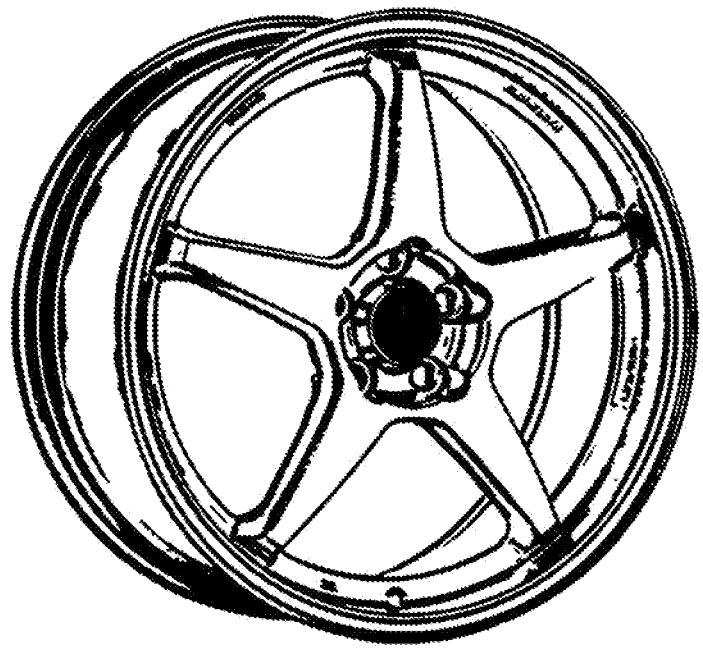
FIG. 8 - Prior Art
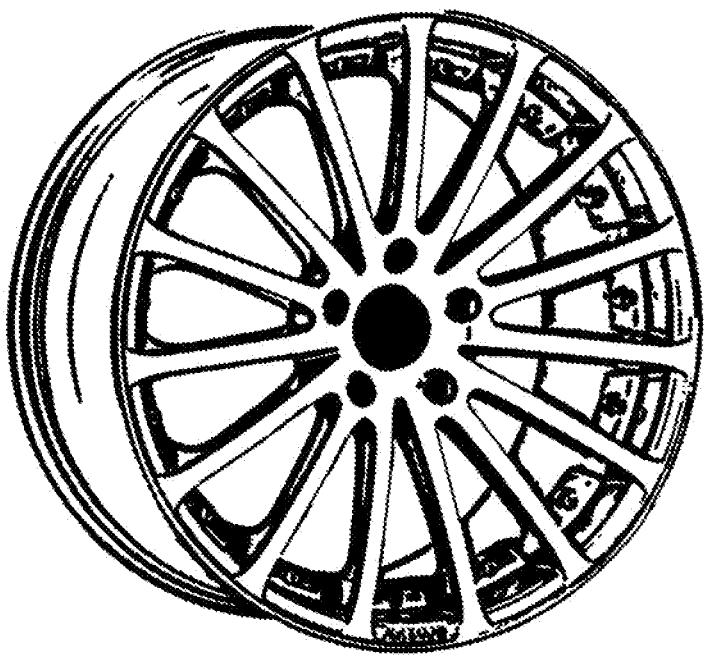
FIG. 9 - Prior Art

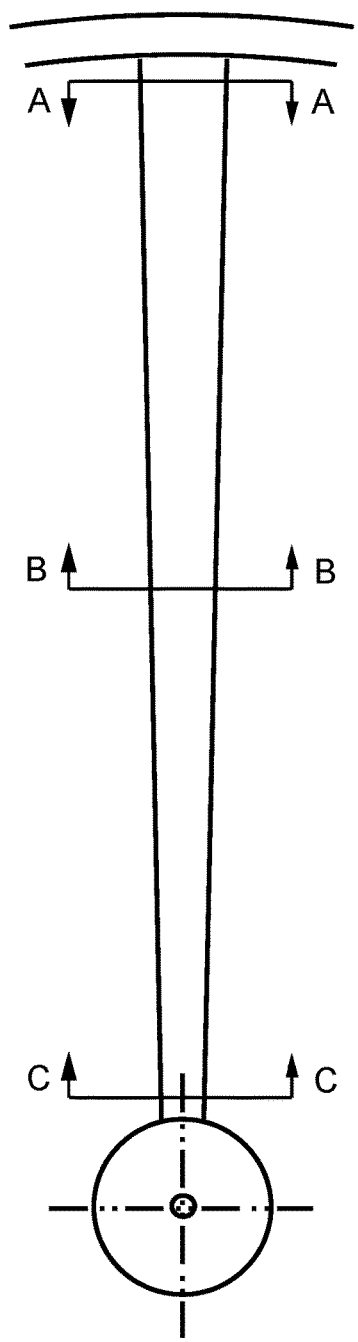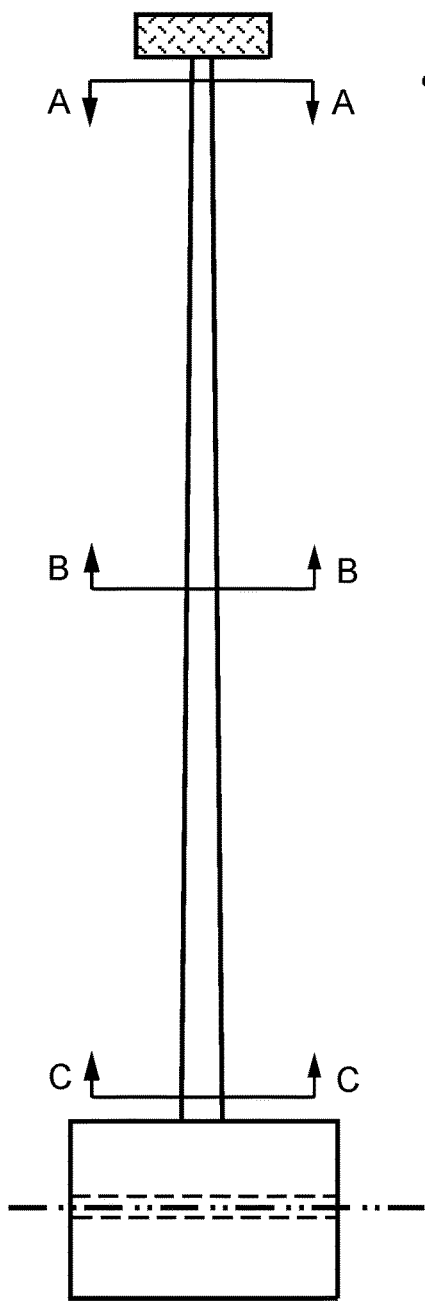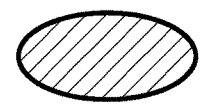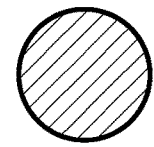
FIG. 21
FIG. 22
FIG. 23
FIG. 19
FIG. 20

WHEEL FAIRING REDUCING VEHICLE DRAG

CROSS-REFERENCE TO RELATED APPLICATION

This application is a continuation of patent application Ser. No. 13/799,005, filed Mar. 13, 2013, which claims the benefit of provisional patent application No. 61/745,357, filed Dec. 21, 2012 by the present inventor.

BACKGROUND

Field

The present embodiment relates to vehicle wheels, and particularly to shields and devices used to reduce drag on rotating vehicle wheels.

Description of Prior Art

Inherently characteristic of rotating vehicle wheels, and particularly of spoked wheels, aerodynamic resistance, or parasitic drag, is an unwanted source of energy loss in propelling a vehicle. Parasitic drag on a wheel includes viscous drag components of form (or pressure) drag and frictional drag. Form drag on a wheel generally arises from the circular profile of a wheel moving though air at the velocity of the vehicle. The displacement of air around a moving object creates a difference in pressure between the forward and trailing surfaces, resulting in a drag force that is highly dependent on the relative wind speed acting thereon. Streamlining the wheel surfaces can reduce the pressure differential, reducing form drag.

Frictional drag forces also depend on the speed of wind impinging exposed surfaces, and arise from the contact of air moving over surfaces. Both of these types of drag forces arise generally in proportion to the square of the relative wind speed, per the drag equation. Streamlined design profiles are generally employed to reduce both of these components of drag force.

The unique geometry of a wheel used on a vehicle includes motion both in translation and in rotation; the entire circular outline of the wheel translates at the vehicle speed, and the wheel rotates about the axle at a rate consistent with the vehicle speed. Form drag forces arising from the moving outline are apparent, as the translational motion of the wheel rim must displace air immediately in front of the wheel (and replace air immediately behind it). These form drag forces arising across the entire vertical profile of the wheel are therefore generally related to the velocity of the vehicle.

As the forward profile of a wheel facing the direction of vehicle motion is generally symmetric in shape, and as the circular outline of a wheel rim moves forward at the speed of the vehicle, these form drag forces are often considered uniformly distributed across the entire forward facing profile of a moving wheel (although streamlined cycle rims can affect this distribution somewhat). This uniform distribution of pressure force is generally considered centered on the forward vertical wheel profile, and thereby in direct opposition to the propulsive force applied at the axle, as illustrated in FIG. 24.

However, as will be shown, frictional drag forces are not uniformly distributed with elevation on the wheel, as they are not uniformly related to the speed of the moving outline of the wheel rim. Instead, frictional drag forces on the wheel surfaces are highly variable and depend on their elevation above the ground. Frictional drag must be considered separate from form drag forces, and can be more significant sources of overall drag on the wheel and, as will be shown, thereby on the vehicle.

The motion of wheel spokes through air creates considerable drag, especially at higher relative wind speeds. This energy loss is particularly critical in both bicycle locomotion and in high-speed vehicle locomotion. Previous efforts to reduce this energy loss in bicycle wheels have included bladed-spoke designs; the addition of various coverings attached directly to the wheel; and the use of deeper, stiffer, and heavier aerodynamic rims. As winds, and particularly headwinds, are a principal source of energy loss in bicycle locomotion, expensive aerodynamic wheel designs have become increasingly popular. However, these aerodynamic wheel designs have often been tuned to reduce form drag, rather than frictional drag. As a result, augmented frictional drag forces present on these larger-surfaced aerodynamic wheel designs tend to offset much of the gains from reduced form drag forces, thereby negating potential reductions in overall drag.

Bladed spokes, tapered in the direction of motion through the wind, are designed to reduce form drag. These streamlined spokes suffer from increased design complexity, increased weight and higher costs. In addition, such bladed designs are more susceptible to crosswind drag effects: The increased surface area of the bladed spoke can rapidly increase form drag in the presence of any crosswind; any crosswind directed upon the flat portion of the spoke quickly increases pressure drag upon the spoke.

Under low crosswinds, the bladed spoke presents a relatively small forward profile facing oncoming headwinds, minimizing form drag. Indeed, the thin profile of the blade generally minimizes form drag over that of round spoke profile. However, most external winds will not be precisely aligned co-directional with the forward motion of the wheel. Such winds cause a crosswind component to be exerted upon the wheel, leading to flow-separation—and thus turbulence—behind the bladed spoke, and thereby generally negate the potential aerodynamic benefit of the bladed-spoke design. Under high crosswinds, the round spoke profile may even outperform the bladed spoke in terms of drag reduction. Perhaps a result of these conflicting factors, the bladed spoke has not become the common standard for use in all bicycle competitions.

Wheel covers generally include a smooth covering material attached directly to the wheel over the outside of the spokes, generally covering a large portion of the wheel assembly, often extending from the wheel rim to the axle. Wheel covers add weight to the wheel assembly and can result in more wheel surface area being exposed to winds. The additional weight on the wheel is detrimental to wheel acceleration, while the large surface area of the cover can increase frictional drag. Although covering the wheel spokes can reduce form drag forces thereon, the increased frictional drag forces on the larger surface areas can largely offset any aerodynamic benefit. In addition, covering large portions of the wheel also increases bicycle susceptibility to crosswind forces, destabilizing the rider. For this reason, wheel covers are generally used only on the rear wheel of a bicycle, and generally only under low crosswind conditions. Perhaps as a result of these conflicting factors, wheel covers have not become the standard equipment for use in all bicycle competitions.

Recently developed for use on bicycles, deeper, stiffer and heavier aerodynamic wheel rims suffer several drawbacks: deeper (wider along the radial direction of the wheel) and streamlined rims are often used to reduce profile drag on high-performance bicycle wheels. As mentioned, these rims are generally designed to reduce profile drag under various crosswind conditions. However, these deeper rims—having generally larger rotating surface areas—can dramatically increase friction drag. As will be shown, friction drag is particularly increased on the expanded upper wheel surfaces, largely negating any potential benefit of the reduced profile drag. In addition, such deep wheel rims with minimal spokes must be made stronger and stiffer—typically with double-wall construction—than conventional single-wall, thin-rim designs. As a result, such deep rims often ride more harshly over bumpy terrain, and are generally heavier, adding weight to the bicycle, which becomes a drawback when the grade becomes even slightly uphill.

As a result of these and other countervailing factors, no single wheel design has emerged as the preferred choice for reducing drag on bicycle wheels over a wide range of operating conditions. Instead, a variety of wheel designs are often employed in modern racing bicycles. In the same competition, for example, some riders may choose to use bladed spokes, while others choose round spokes, while still others choose deep rims or wheel covers. The differences in performance between these various wheel designs appear to only marginal affect the outcome of most races.

In sports cars, wheel covers have been employed to reduce aerodynamic vortices from developing inside the inner wheel assembly. These covers smooth the air flowing over the outer wheel and deflect a portion of the air to the brake linings, providing cooling thereon. In addition, various wings attached to the body of the car have been employed to deflect air around the drag-inducing exposed wheels. Such wings are generally located low to the ground, and are often configured to deflect air to one side or the other of exposed wheels, or to provide vehicle down-forces to counteract significant lifting forces generated by the exposed wheels. As will be shown, use of these wings to deflect air upwards onto the upper wheel can actually augment the down force problem, as well as contribute to more overall vehicle drag. And related flip-up deflectors have been incorporated into the body molding of some sports cars, although these have been generally limited to placement in front of the semi-exposed rearmost wheel. Such flip-up deflectors have also been used to augment down-forces in order to enhance vehicle stability at high speeds.

In various cycles, fenders and mud-covers have been used to cover wheels for other purposes. However, these items are generally oriented on the cycle consistent with their intended purpose of shielding the rider from debris ejected from the wheel. As such, they are not necessarily designed to be either forwardly positioned, nor closely fitted to the tire and wheel for aerodynamic shielding purposes. On some bicycles, skirt guards have been employed specifically to prevent clothing of the rider from becoming entangled with the rotating wheel. However, these guards are often made of porous construction, and are generally employed on the rear-most wheel, rather than on the front-most wheel, where the potential aerodynamic benefit is generally greater.

Perhaps because aerodynamic devices are generally not allowed by rules governing many bicycle competitions, development of fairings for bicycles remains somewhat limited. Instead, fairings have been generally used to cover either the entire cycle, or the broad front area of the cycle, shielding both rider and cycle. Enclosing-type fairings typically have quite large surface areas, which augment frictional drag forces, largely negating any benefit in reducing form drag from streamlining the forward profile of the bicycle. Nevertheless, numerous bicycle speed records have been achieved using these larger fairings, validating their effectiveness. Frontal wind-deflecting fairings are typically used to reduce form drag on various components on a cycle; however, their greatly expanded surface areas can minimize their effectiveness by introducing greater frictional drag. The potential effectiveness of using smaller fairings—having minimal form and friction drag—for shielding specific, critical, drag-sensitive areas of moving wheel surfaces has not been properly recognized.

A study by Sunter and Sayers (2001), Aerodynamic Drag Mountain Bike Tyres, *Sports Engineering*, 4, 63-73, proposed and tested the use of a front-mounted wind-deflector fender for relatively low-speed, rough-surfaced, down-hill racing mountain bicycle front wheels. However, as will be shown, the tested fender was unnecessarily extensive; its extended design—covering the tire to well below the level of the axle—failed to focus properly on key sources of drag on a typical bicycle wheel. Instead, in this investigation, variations in drag were measured with differing tire tread patterns, and differing fender clearances, using knobby mountain bike tires, and were measured on the front wheel only. Moreover, sufficient fender clearances with the tire were investigated, with the aim of determining any potential benefit in reducing drag on the bicycle against the potential mud accumulation there-between.

Referencing an earlier study, Kyle (1985) Aerodynamic Wheels. *Bicycling*, December, 121-124, in this later study, Sunter and Sayers noted a 30% increase in drag on a wheel rotating with a speed equivalent to the exposed headwind, versus a stationary wheel exposed to the same headwind. As reported, this measurement seems to have represented the increase in torque needed to rotate the wheel about the axle. However, the change in torque measured about the axle on a fixed wheel mounted in an air-stream—as will be shown—cannot be considered an accurate representation of the change in drag force required to propel the bicycle. Torque measured this way is only an indirect factor needed to determine the effects on overall bicycle drag. As will be shown, the net drag force is generally not well centered on the rotating bicycle wheel, causing drag forces on the upper wheel to be magnified. Indeed, the offset drag force on the wheel contributes significantly more to overall bicycle drag than commonly understood.

A number of studies of bicycle wheel drag measured in wind tunnels also fail recognize the importance of drag forces on the upper wheel. Tests are typically conducted with the wheel suspended in the airstream, with the drag on the wheel measured via force gauges attached to the suspension arm. As will be shown, the magnification of upper wheel drag forces occurs when the wheel is in contact with the ground. Measuring drag on wheels suspended in an airstream will yield incomplete results, particularly for application to moving vehicles.

For example, an earlier study by Greenwell et al, Aerodynamic characteristics of low-drag bicycle wheels, *Aeronautical Journal*, 1995, 99, 109-120, measured translational drag on a wheel suspended from a torsion tube in a wind tunnel, where the wheel was driven by a motor and made no contact with a ground plane. They concluded that in this configuration—unexpectedly—rotational speed had little influence on the translational drag force directed upon the wheel assembly.

In a more recent study, Moore and Bloomfield, Translational and rotational aerodynamic drag of composite construction bicycle wheels, Proceedings of the Institution of Mechanical Engineers, Part P: *Journal of Sports Engineering and Technology* Jun. 1, 2008, vol. 222, no. 2, 91-102, the measured drag was extended to include rotational drag on the wheel. However, this study also failed to include a ground plane in contact with the wheel; the wheel remained suspended wind tunnel. As mentioned, this configuration does not accurately reflect the total retarding force upon a vehicle in motion caused by drag forces on the wheel.

Sunter and Sayers also failed to recognize the magnifying effect that an off-center net drag force on the wheel can have on overall bicycle drag. Instead, they concluded that with the modest improvement in drag torque measured upon the rotating wheel using the wind-deflecting fender, only corresponding modest improvement in overall bicycle drag could be expected. They further concluded that the use of extensive front-wheel wind-deflecting fenders—having a rather large forward profiles—might thus prove beneficial in the specific application of mountain bicycle downhill racing, where only modest reductions in overall drag might yield a winning advantage in higher speed races. This conclusion would be consistent with the faulty observation that total drag forces are generally well centered on the wheel.

It has long been recognized that minimizing drag on large trucks and their trailers has significant potential for improving fuel economies. Extensive wind deflectors have been used in front of the rear wheels on extended truck trailers, but are generally designed to deflect very large volumes of air to the either side of the rear wheels. Deflecting unnecessary volumes of air with large fairings, can produce significant form drag by the fairing itself, thereby negating much of the intended benefit in reducing wheel drag. And as will be shown, deflecting air below the level of the axle can be particularly detrimental in reducing overall vehicle drag.

For example, in patent US 2010/0327625A1, a V-shaped air deflector is shown positioned in front of a wheel for the purpose of deflecting large volumes of air to either side in order to reduce wheel drag. However, the deflector shown is unnecessarily large, introducing substantial form drag. And the deflector is positioned centered at the elevation of the axle, extending symmetrically above and below the axle. As mentioned, deflecting air onto lower surfaces of the wheel can be detrimental to reducing overall drag on the vehicle. And as shown, the deflector fails to fully shield the most critical drag-inducing uppermost surfaces of the wheel.

In U.S. Pat. No. 6,974,178B2, the deflectors shown are simply unnecessarily large, again introducing substantial form drag.

Other examples in the art also deflect air downward onto the lower surfaces of the wheel, thereby negating much of the intended aerodynamic benefit. These include trailer wheel deflectors of patents US 2010/0066123A1, U.S. Pat. Nos. 4,640,541, 4,486,046 and 4,262,953.

Other examples in the art also shield headwinds from lower surfaces of the wheel below the axle, thereby also negating much of the intended aerodynamic benefit. These include fairings of patents US 2011/0080019A1, U.S. Pat. No. 7,520,534B2, U.S. Pat. No. 7,322,592B2, U.S. Des. 377,158, U.S. Pat. Nos. 5,348,328, 4,773,663, 4,411,443, 4,326,728 and 2,460,349.

Wheel fairings often used on light aircraft are generally designed for reduced form drag of the wheel assembly while airborne, and generally cover the upper wheel to well below the axle. An example is shown in U.S. Pat. No. 4,027,836. Wheel pants designed as mud covers for shielding wings from ejected debris are also seen in the art, showing an upper wheel fender designed with extensive streamlined surfaces often extending substantially above and behind the wheel. As will be shown, such designs are not optimized for terrestrial use, either by extending below the level of the axle, or by not optimally shielding the most critical drag-inducing surfaces of the upper wheel.

Other examples in the art show skirt guards on the rear wheel of cycles, where the potential aerodynamic benefit is considerably less than that of the front wheel. These include guards of patents U.S. D634,249S, U.S. Pat. Nos. 3,101,163 and 1,027,806. And fender of patent U.S. D612,781S is not shown mounted on a vehicle.

Spoke art includes many examples having rectangular or otherwise non-aerodynamic cross-sectional profiles of wheel spokes for use in automotive applications. Examples include patents U.S. D460,942, U.S. D451,877, U.S. D673, 494, U.S. D396,441 and others.

Cycle spoke art includes a tapered spoke of U.S. Pat. No. 5,779,323 where the cross-sectional profile of the spoke changes from more highly elliptical near the wheel hub to more generally oval near the wheel rim. As will be shown, the spoke shown is tapered to minimize—rather than maximize—any aerodynamic benefit, especially when used in the presence of crosswinds. Tires are generally designed with tread patterns intended to maximize traction with the road surface and to minimize rolling friction and road noise. A wide variety of tread patterns exist, each designed for specific vehicle applications. Some tires with aggressive tread patterns are designed for maximum traction in off-road conditions. These tires generally have square or rectangular lugged patterns in the tread, and suffer from increased road noise and wind resistance. The need for tires with aggressive tread patterns specifically designed to reduce drag on the vehicle have been largely overlooked.

For example, in US patent 2007/0151644 A1, an oval-shaped tread pattern is shown. While oval shaped tread lugs have the potential to reduce drag, their closely spaced pattern shown diverts most of the air to flow over the top surfaces of the tire, rather than between the lugs. Moreover, the closely spaced oval lugs are designed to reduce stresses during tire compression—thereby improving the rolling resistance of the tire—and to reduce the incidence of trapping stones between the lugs. As such, the minimally spaced lugs are an essential characteristic of this embodiment. As disclosed, any minor improvement in the aerodynamic characteristics of the tire was not included.

SUMMARY

An embodiment comprises an aerodynamically optimized wheel cover shielding critical upper drag-inducing wheel surfaces from headwinds, thereby reducing the total drag-induced resistive forces upon the wheel assembly and minimizing needed vehicle propulsive counter-forces.

An embodiment comprises an aerodynamically optimized wind-deflecting fairing shielding critical upper drag-inducing wheel surfaces from headwinds, thereby reducing the total drag-induced resistive forces upon the wheel assembly and minimizing needed vehicle propulsive counter-forces.

An embodiment comprises a vehicle engine exhaust pipe disposed to cause ejected exhaust gases to deflect headwinds to shield critical upper drag-inducing wheel surfaces, thereby reducing the total drag-induced resistive forces upon the wheel assembly and minimizing needed vehicle propulsive counter-forces.

An embodiment comprises an automotive spoked wheel having streamlined oval-shaped wheel spokes, arranged in one or more transverse rows for enhanced axial strength, thereby reducing the total drag-induced resistive forces upon the wheel assembly and minimizing needed vehicle propulsive counter-forces.

An embodiment comprises a streamlined tailfin rotatably attached to a wheel spoke, pivotable about the spoke in response to varying crosswind conditions, thereby reducing potential turbulent flow separation behind the spoke and tailfin due to crosswinds, and thereby reducing the total drag-induced resistive forces upon the wheel assembly and minimizing needed vehicle propulsive counter-forces.

An embodiment comprises a cycle wheel spoke tapered from a streamlined blade or highly elliptical cross-sectional profile nearest the wheel rim for reduced drag from higher speed headwinds, to a more circular cross-sectional profile nearest the wheel central hub where the relative crosswind components are higher, thereby minimizing potential drag-induced turbulent flow separation behind spoke surfaces along the entire length of the spoke, and thereby reducing the total drag-induced resistive forces upon the wheel assembly and minimizing needed vehicle propulsive counter-forces.

An embodiment comprises tire having aerodynamically optimized tread blocks diposed in an aerodynamically optimized pattern, reducing drag from headwinds on critical upper drag-inducing tire surfaces, and thereby reducing the total drag-induced resistive forces upon the wheel assembly and minimizing needed vehicle propulsive counter-forces.

An embodiment comprises a method for optimally minimizing the total drag-induced resistive forces upon the wheel assembly of a vehicle, and thereby minimizing needed vehicle propulsive counter-forces.

DESCRIPTION OF THE DRAWINGS

While one or more aspects pertain to most wheeled vehicles not otherwise having fully shielded wheels that are completely protected from oncoming headwinds, the embodiments can be best understood by referring to the following figures.

FIG. 8 shows an example of prior art for automotive spoked wheels with minimal spokes, as typically found on modern automobiles, illustrating the typical square profile of the spokes, which increases drag on critical rotating wheel surfaces.

FIG. 9 shows an example of prior art for automotive spoked wheels with many outwardly-positioned spokes, as typically found on high-performance sports cars, illustrating the typical rectangular profile of the spokes, which increases drag on critical rotating wheel surfaces.

FIG. 19 shows a tapered spoke for use on a typical racing bicycle wheel. The spoke is shown tapering from a highly elliptical cross-sectional profile located nearest the wheel rim—shown at the top of the figure—to a more circular cross-sectional profile located on the spoke nearest the wheel central hub—shown at the bottom of the figure.

FIG. 20 shows a side view of the tapered spoke of FIG. 19.

FIG. 21 shows the highly elliptical cross section A-A of the tapered spoke shown in FIGS. 19 and 20.

FIG. 22 shows the more oval cross section B-B of the tapered spoke shown in FIGS. 19 and 20.

FIG. 23 shows the near circular cross section C-C of the tapered spoke shown in FIGS. 19 and 20.

DETAILED DESCRIPTION

Various embodiments are described below in detail, each with means providing a reduction in drag on the wheel assembly of a vehicle. As such, each may considered as one embodiment of a comprehensive category of embodiments, whose scope is limited to that defined herein, and later referred thereto as: drag reduction means.

Furthermore, embodiments depicted in FIGS. 1, 2, 3, 4, 5 and 7 are described below and belong to a comprehensive category of embodiments, whose scope is limited to that defined herein, and later referred thereto as: wheel cover.

Figure 1:
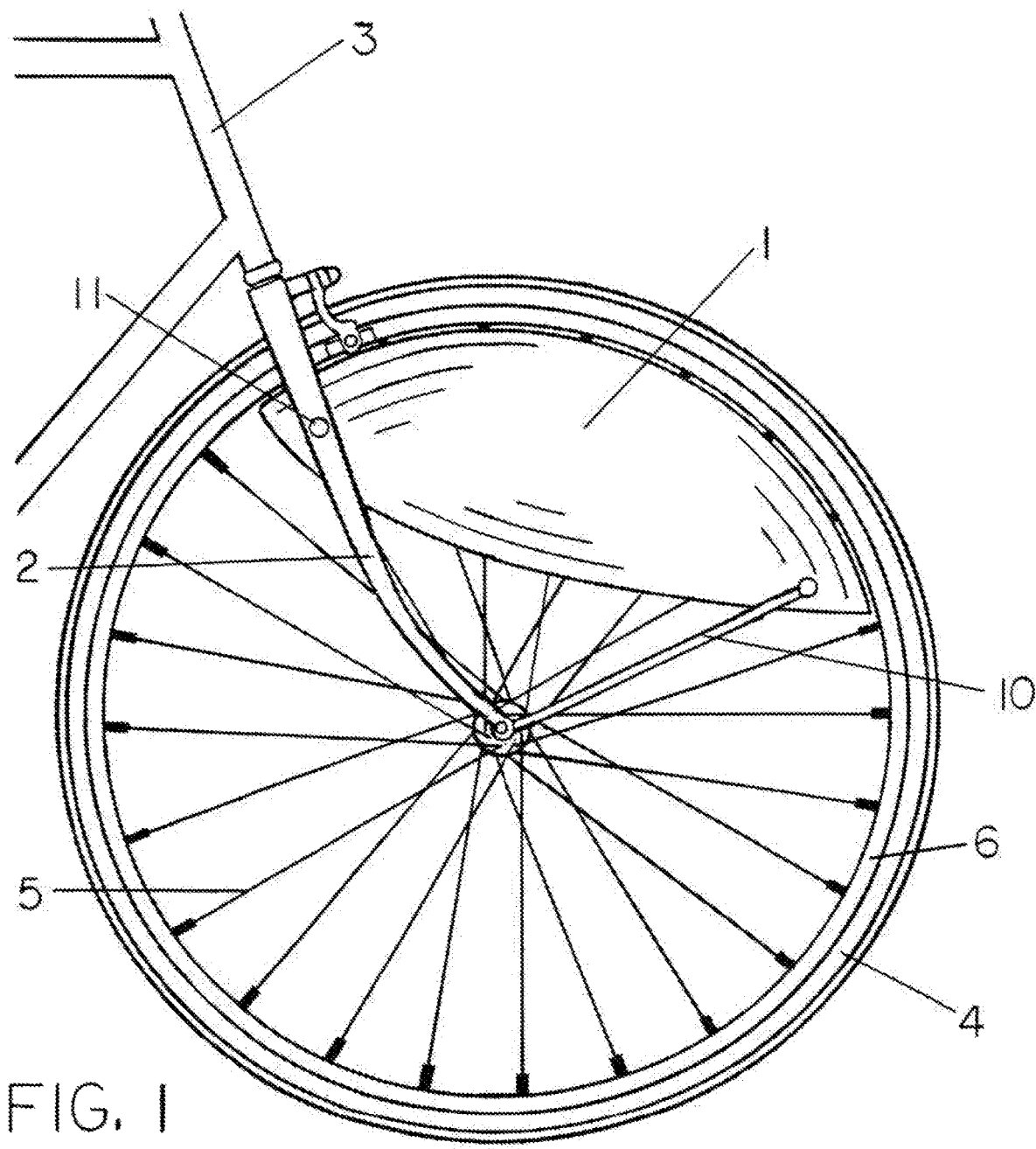
FIG. 1 is a front cycle wheel assembly, as typically found on a bicycle or motorcycle, where a fairing is attached and positioned as shown to each interior side of the fork assembly, thereby shielding the upper- and front-most surfaces of the spoked wheel from oncoming headwinds.

First Embodiment—Description—FIG. 1

As shown in FIG. 1, a streamlined fairing 1 is attached to the inside of a front fork tube assembly 2 of a typical bicycle 3 having spoked wheels 4. The fairing 1 is positioned closely adjacent to the inside structure of wheel 4, covering much of the upper and front-most quadrant of the wheel 4 as shown, and is rigidly fixed to front-fork tube assembly 2 using fastener 11 and strut 10. While only one fairing 1 is shown, the embodiment will generally include a similar fairing 1 located on the opposite side of the wheel 4, thereby shielding the entire upper inner structure of wheel 4 from the oncoming wind caused by forward motion of cycle 3. The fairing 1 has sufficient structural rigidity to allow close placement to spokes 5 and rim 6 of the wheel 4, thereby minimizing oncoming wind from leaking into the inner structure of wheel 4.

With fairing 1 configured in this way, the spokes 5 positioned near the top of the wheel 4 are shielded from headwinds. Shielded in this way, the topmost spokes 5 are moving at an effective wind speed generally less than or equal to the ground speed of the cycle 3, rather than moving at an effective headwind speed of up to nearly twice the ground speed of cycle 3. As a result, the aerodynamic drag forces exerted upon the topmost spokes 5 are greatly reduced.

The reduction in drag force due to fairing 1 is generally greater near the top of the wheel 4, where the spokes 5 are moving fastest with respect to headwinds otherwise impinging thereupon. As uppermost spokes 5 rotate away from the topmost point to an intermediate position with respect to either of the two lateral mid-points at the height of the axle on the wheel 4, these headwind drag forces are greatly reduced.

The embodiment shown in FIG. 1 includes a minimal fairing 1 positioned closely adjacent to the wheel, and shielding generally the most critical upper and forward-oriented quadrant of wheel 4, minimizing the addition of unnecessary weight or drag-inducing structure to cycle 3. The fairing 1 shown extends sufficiently rearward to provide a measure of profile shielding of the rear portion of the wheel and spokes, diverting the wind from impinging directly the rear rim of the wheel, and thereby permitting a generally streamlined flow to be maintained across the entire upper section of wheel assembly.

First Embodiment—Operation—FIGS. 1, 17, 18, 23 and 24

The shielding provided by fairing 1 is particularly effective since aerodynamic forces exerted upon exposed vehicle surfaces are generally proportional to the square of the effective wind speed impinging thereon. Moreover, the power required to overcome these drag forces is generally proportional to the cube of the effective wind speed. Thus, it can be shown that the additional power required to overcome these drag forces in propelling a vehicle twice as fast over a fixed distance, in half the time, increases by a factor of eight. And since this power requirement is analogous to rider effort—in the case of a bicycle rider—it becomes critical to shield the most critical drag-inducing surfaces on a vehicle from oncoming headwinds.

In any wheel used on a vehicle, and in the absence of any external headwinds, the effective horizontal wind speed at a point on the wheel at the height of the axle is equal to the ground speed of the vehicle. Indeed, the effective headwind speed upon any point of the rotating wheel depends on that point's current position with respect to the direction of motion of the vehicle.

Notably, a point on the moving wheel coming into direct contact with the ground is necessarily momentarily stationary, and therefore is not exposed to any relative wind speed, regardless of the speed of the vehicle. While the ground contact point can be rotating, it is not translating; the contact point is effectively stationary. And points on the wheel nearest the ground contact point are translating with only minimal forward speed. Hence, drag upon the surfaces of the wheel nearest the ground is generally negligible.

Contrarily, the topmost point of the wheel assembly (opposite the ground) is exposed to the highest relative wind speeds: generally at least twice that of the vehicle speed. And points nearest the top of the wheel are translating with forward speeds substantially exceeding the vehicle speed. Thus, drag upon the surfaces of the upper wheel can be quite substantial. Lower points on the wheel are exposed to lesser effective wind speeds, approaching a null effective wind speed—and thus negligible drag—for points nearest the ground.

Figure 24:
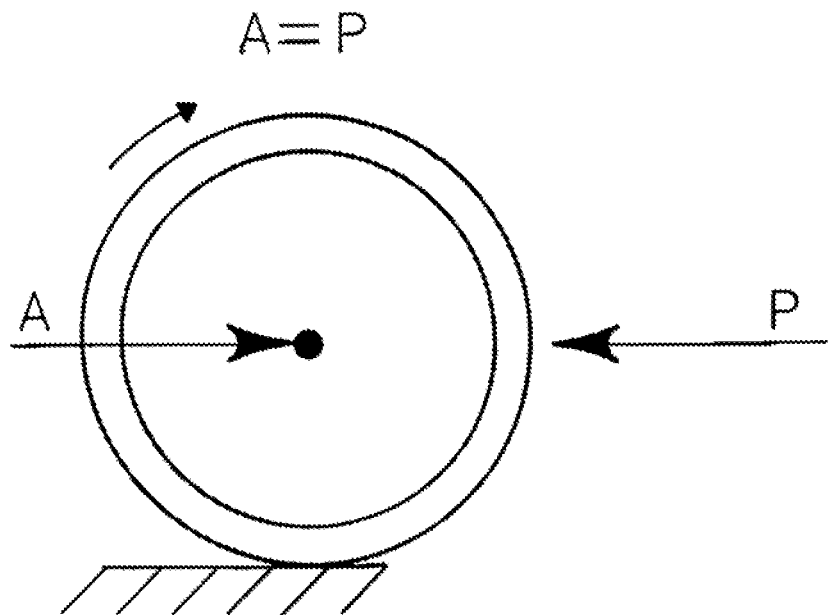
FIG. 24 is a diagram of a wheel rolling on the ground representing typical prior art models, showing the net pressure drag force (P) exerted upon the forward wheel vertical profile—which moves at the speed of the vehicle—being generally centered near the axle of the wheel and balanced against the propulsive force (A) applied at the axle.
Figure 25:
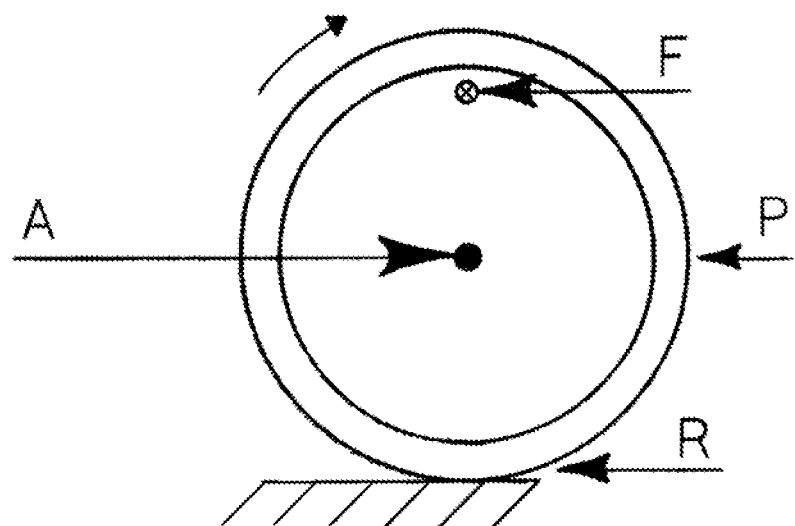
FIG. 25 is a diagram of a wheel rolling on the ground, showing the net friction drag force (F) upon the wheel surfaces—which move at different speeds depending on the elevation from the ground—being offset from the axle and generally centered near the top of the wheel. A ground reaction force (R)—arising due to the drag force being offset near the top of the wheel—is also shown. The force (A) applied at the axle needed to overcome the combination of drag forces (F+P) and reaction force (R) is also shown.
Figure 26:
FIG. 26 shows a tire with an off-road tread pattern typical of prior art, having relatively sharp, angular, non-aerodynamic both windward- and leeward-facing sides on each tread block.

Importantly, due to the rotating geometry of the wheel, it can be shown that the effective combined frictional drag force exerted upon the wheel is typically centered in closer proximity to the top of the wheel, rather than centered closer to the axle as has been commonly assumed in many past analyses of total wheel drag forces. While the net pressure (or form) drag (P) force on the forwardly facing profile of the wheel is generally centered with elevation and directed near the axle on the wheel (as shown in FIG. 24), the net frictional drag force (F) upon the moving surfaces is generally offset to near the top of the wheel (as shown in FIG. 25).

Indeed, it is near the top of the wheel where the relative winds are both greatest in magnitude, and are generally oriented most directly opposed to the forward motion of rotating wheel surfaces. Moreover, in the absence of substantial external headwinds, the frictional drag exerted upon the lower wheel surfaces contributes relatively little to the net drag upon the wheel, especially when compared to the drag upon the upper surfaces. The combined horizontal drag forces (from pressure drag from headwinds deflected by both the leading and trailing wheel forwardly facing profiles, and from frictional drag from headwinds impinging upon the forwardly moving surfaces) are thus generally concentrated near the top of the wheel under typical operating conditions. Moreover, with the faster relative winds being directed against the uppermost wheel surfaces, total drag forces combine near the top to exert considerable retarding torque upon the wheel.

As mentioned, the horizontal drag forces are primarily due to both pressure drag forces generally distributed symmetrically across the forwardly facing vertical profiles of the wheel, and to winds in frictional contact with moving surfaces of the wheel. Pressure drag forces arise primarily from the displacement of air from around the advancing vertical profile of the wheel, whose circular outline moves at the speed at the vehicle. As discussed above, since the entire circular profile moves uniformly at the vehicle speed, the displacement of air from around the moving circular profile is generally uniformly distributed with elevation across the forwardly facing vertical profile of the wheel. Thus, these pressure drag forces (P, as shown in FIG. 24 and FIG. 25) are also generally evenly distributed with elevation across the entire forwardly facing vertical profile of the wheel, and centered near the axle. And these evenly distributed pressure drag forces arise generally in proportion only to the effective headwind speed of the vehicle.

Frictional drag forces (F, as shown FIG. 25), however, are concentrated near the top of the wheel where moving surfaces generally exceed vehicle speed—while the lower wheel surfaces move at less than the vehicle speed. Since drag forces are generally proportional to the square of the effective wind speed, it becomes apparent that with increasing wind speed, that these upper wheel frictional drag forces directed upon the moving surfaces increase much more rapidly than do pressure drag forces directed upon the forward profile of the wheel. Indeed, these friction drag forces generally arise in much greater proportion to an increasing effective headwind speed of the vehicle. Nevertheless, these increased frictional drag forces being directed on the upper wheel is only a partial factor contributing to augmented wheel drag forces being responsible for significantly retarded vehicle motion.

Significantly, both types of drag forces can be shown to exert moments of force pivoting about the point of ground contact. And as such, either type of drag force exerted upon the upper wheel retards vehicle motion considerably more than a similar force exerted upon a substantially lower surface of the wheel. Minimizing these upper wheel drag forces is therefore critical to improving propulsive efficiency of the vehicle.

Also important—and due to the rotating geometry of the wheel—it can be shown that the vehicle propulsive force on the wheel applied horizontally at the axle must substantially exceed the net opposing drag force exerted near the top of the wheel. These forces on a wheel are actually leveraged against each other, both pivoting about the same point—the point on the wheel which is in stationary contact with the ground—and which is constantly changing lateral position with wheel rotation. Indeed, with the geometry of a rolling wheel momentarily pivoting about the stationary point of ground contact, the lateral drag and propulsive forces each exert opposing moments of force on the wheel centered about this same point in contact with the ground.

Furthermore, unless the wheel is accelerating, the net torque from these combined moments on the wheel must be null: The propulsive moment generated on the wheel from the applied force at the axle must substantially equal the opposing moment from drag forces centered near the top of the wheel (absent other resistive forces, such as bearing friction, etc.). And the propulsive moment generated from the applied force at the axle has a much shorter moment arm (equal to the wheel radius) than the opposing moment from the net drag force centered near the top of the wheel (with a moment arm substantially exceeding the wheel radius)—since both moment arms are pivoting about the same stationary ground contact point. Thus, for these opposing moments to precisely counterbalance each other, the propulsive force applied at the axle—with the shorter moment arm—must substantially exceed the net drag force near the top of the wheel.

In this way, the horizontal drag forces exerted upon the upper surfaces of the wheel are leveraged against opposing and substantially magnified forces at the axle. Hence, a relatively small frictional drag force centered near the top of the wheel can have a relatively high impact on the propulsive counterforce required at the axle. Shielding these upper wheel surfaces can divert much of these headwind-induced drag forces directly onto the vehicle body, thereby negating much of the retarding force amplification effects due to the pivoting wheel geometry.

Moreover, since the propulsive force applied at the axle exceeds the combined upper wheel drag forces, a lateral reaction force (R, as shown in FIG. 25) upon the wheel is necessarily developed at the ground contact point, countering the combined unbalanced propulsive and drag forces on the wheel: Unless the wheel is accelerating, the reaction force at the ground, together with the upper wheel net drag forces (F+P), combine (A=F+R+P, as shown in FIG. 25) to countervail the lateral propulsive force (A) applied at the axle. This reaction force is transmitted to the wheel through frictional contact with the ground. In this way, an upper wheel drag force is further magnified against the axle. For these multiple reasons, it becomes crucial to shield the upper wheel surfaces from exposure to headwinds.

Given that the propulsive force (A) applied at the axle must overcome both the net wheel drag forces (F+P) and the countervailing lower reaction force (R) transmitted through the ground contact point, it can be shown that the net drag force upon the upper wheel can oppose vehicle motion with nearly twice the sensitivity as an equivalent drag force upon the static frame of the vehicle. Hence, shifting the impact of upper wheel drag forces to the static frame can significantly improve the propulsive efficiency of the vehicle.

Furthermore, as drag forces generally increase in proportion to the square of the effective wind speed, the more highly sensitive upper wheel drag forces increase far more rapidly with increasing headwind speeds than do vehicle frame drag forces. Thus, as the vehicle speed increases, upper wheel drag forces rapidly become an increasing component of the total drag forces retarding vehicle motion.

And given the greater sensitivity of speed-dependent upper wheel drag forces—as compared against vehicle frame drag forces—to the retarding of vehicle motion, considerable effort should first be given to minimizing upper wheel drag forces. And shielding the faster-moving uppermost surfaces of the wheel assembly from oncoming headwinds, by using the smallest effective fairing assembly, is an effective means to minimize upper wheel drag forces.

Contrarily, drag forces on the lower wheel generally oppose vehicle motion with reduced sensitivity compared to equivalent drag forces on the static frame of the vehicle. Propulsive forces applied at the axle are levered against lower wheel drag forces, magnifying their impact against these lower wheel forces. Shielding lower wheel surfaces can generally negate this mechanical advantage, and can actually increase overall drag on the vehicle.

Moreover, as discussed above, headwinds on the static frame generally exceed the speed of winds impinging the lower surfaces of the wheel. Hence, frictional drag forces on the lower wheel surfaces are greatly reduced. Thus, it is generally counterproductive to shield the wheel below the level of the axle. Drag on a vehicle is generally minimized with upper wheel surfaces shielded from headwinds and with lower wheel surfaces exposed to headwinds.

Wheel drag sensitivity to retarding vehicle motion becomes even more significant in the presence of external headwinds. With external headwinds, the effective wind speed impinging the critical upper wheel surfaces can well exceed twice the vehicle speed. Shielding protects the upper wheel surfaces both from external headwinds, and from headwinds due solely to vehicle motion.

Indeed, wheel surfaces covered by the shield are exposed to winds due solely to wheel rotation; headwinds are deflected. The effective drag winds beneath the shield are generally directed tangentially to rotating wheel surfaces, and vary in proportion to radial distance from the axle, reaching a maximum speed at the wheel rim equal to the vehicle speed, regardless of external headwinds. Since drag forces vary generally in proportion to the square of the wind speed, the frictional drag forces are considerably reduced on shielded upper wheel surfaces. Using these wind shields, shielded wheel surfaces are exposed to substantially reduced effective wind speeds—and to generally much less than half of the drag forces without shielding.

Diminished drag forces from external headwinds impinging the slower moving lower surfaces of a rolling wheel generally oppose wheel motion with much less retarding torque than drag forces from winds impinging the faster upper surfaces. Indeed, tests demonstrate that with upper shields installed on a suspended bicycle wheel, the wheel will spin naturally in the forward direction when exposed to headwinds. Without the shields installed, the same wheel remains stationary when exposed to headwinds, regardless of the speed of the headwind. And an unshielded spinning wheel will tend to stop spinning when suddenly exposed to a headwind.

This simple test offers an explanation for the unexpected result achieved from Greenwell—mentioned above—and demonstrates that by minimally shielding only the upper wheel surfaces from external headwinds, the overall drag upon the rotating wheel can be substantially reduced.

Furthermore, as external headwinds upon a forwardly rotating vehicle wheel add relatively little frictional drag to the lower wheel surfaces—which move forward at less than the vehicle speed—but add far more significant drag to the upper wheel surfaces, which move forward faster than the vehicle speed and which can more significantly retard vehicle motion, shielding the upper wheel surfaces against headwinds is particularly beneficial. Since drag forces upon the wheel are generally proportional to the square of the effective wind speed thereon, and the additional drag on the wheel—and thereby on the vehicle—increases rapidly with headwinds, shielding these upper surfaces greatly reduces the power required to propel the vehicle. Moreover, the relative effectiveness of shielding upper wheel surfaces generally increases with increasing headwinds.

Figure 18:
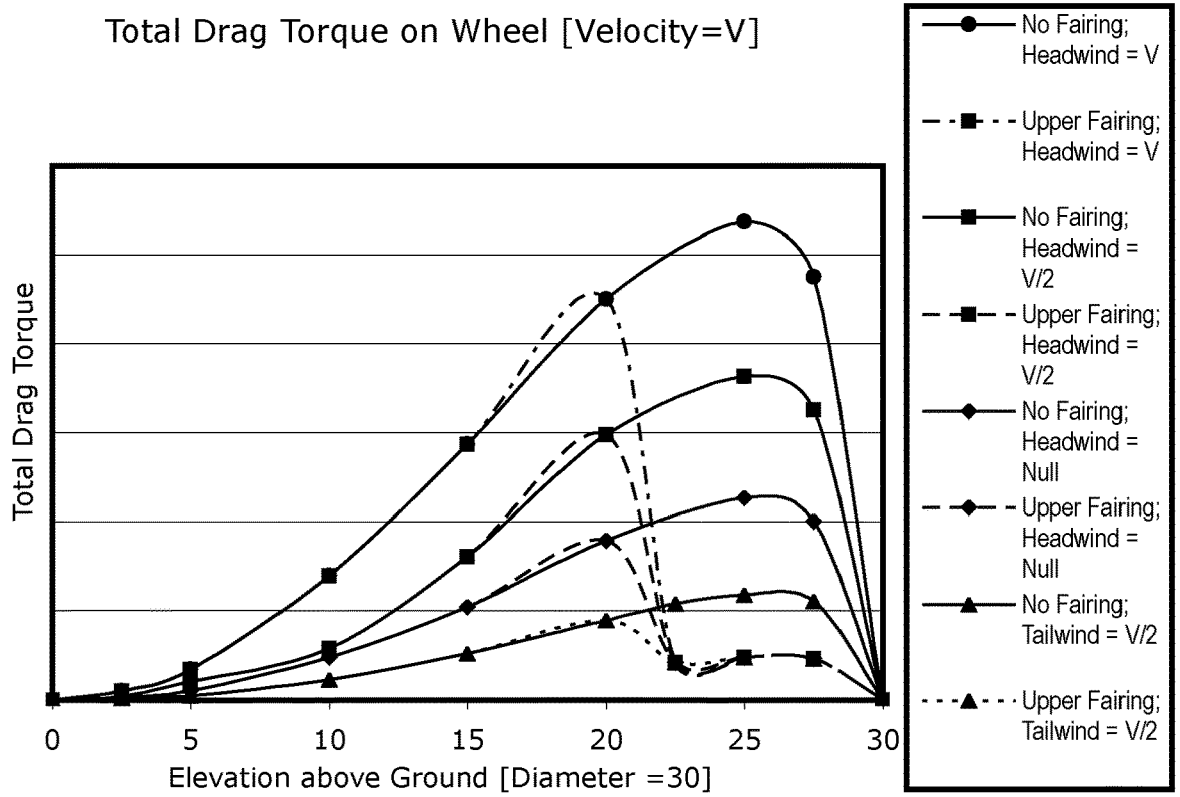
FIG. 18 shows a plot of calculated relative drag torque exerted upon rotating wheel surfaces as a function of elevation above the ground. The relative total drag torques are determined from the calculated average moments in combination with the chord length at various elevations on a wheel moving at a constant speed of V, for several different wind and wheel-surface shielding conditions. Relative magnitudes in total drag torque about the ground contact point as a function of elevation are plotted for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The areas under the plotted curves represent the total torque from frictional drag on wheel surfaces. Comparing the differences in area under the plotted curves reveals the general trend of the upper shield to substantially reduce the total drag torque on the rotating wheel.

An examination of the retarding wind vectors on a rotating wheel can reveal the large magnitude of drag retarding moments upon the uppermost wheel surfaces, relative to the lower wheel surfaces. And an estimate of the frictional drag torque on the wheel can be determined by first calculating the average moments due to drag force vectors at various points—all pivoting about the ground contact point—on the wheel (results shown plotted in FIG. 17), and then summing these moments at various wheel elevations above the ground and plotting the results (FIG. 18). The area under the resulting curve (shown in FIG. 18 as a series of curves representing various headwind conditions) then represents the total frictional drag (absent profile drag) torque upon the wheel.

In order to determine the relationship between this torque and elevation on the wheel, the magnitudes of the drag wind vectors that are orthogonal to their corresponding moment arms pivoting about the point of ground contact must first be determined. These orthogonal vector components can be squared and then multiplied by the length of their corresponding moment arms, in order to determine the relative moments due to drag at various points along the wheel rim.

The orthogonal components of these wind vectors tend to increase linearly with elevation for points on the rim of the wheel, and also for points along the vertical mid-line of the wheel. Calculating the moments along the vertical mid-line of the wheel can yield the minimum relative drag moments at each elevation. Calculating an average of the maximum drag moment at the rim combined with the minimum drag moment along the mid-line can then yield the approximate average drag moment exerted at each elevation upon the wheel. Multiplying this average drag moment by the horizontal rim-to-rim chord length can yield an estimate of the drag torque exerted upon the wheel at each elevation level (FIG. 18). These calculations are simply determined from the geometry of the rotating wheel; the object of this analysis is to determine the likely relative magnitudes of drag torques upon the wheel at various elevations.

From the resulting plots (FIG. 18), it can be estimated that the uppermost approximate one-third section of the wheel likely contributes most of the overall drag torque upon the wheel. Thus, by shielding this upper section from headwinds, drag torque can be considerably reduced. With upper-wheel shielding, as noted above, the relative winds beneath the shield are due mostly to wheel rotation, and are generally directed tangentially to the wheel. The resulting drag torque under the shielded sections can then be determined as above, and compared with the unshielded drag torque for similar headwind conditions.

These calculations—generally confirmed by tests—indicate a substantial reduction in retarding drag torque upon the shielded upper wheel surfaces. In the absence of external headwinds, the plots of FIG. 18 indicate that shielding the uppermost approximate one-third section of the wheel can reduce the drag torque of this section considerably, by as much as 75 percent. Moreover, repeating calculations and testing with an external headwind equal to the vehicle speed indicates that upper wheel shielding can reduce the comparative upper wheel drag torque of this section by still more, perhaps by as much as 90 percent. Hence, the potential effectiveness of shielding upper wheel surfaces can be significant, especially with surfaces having higher drag sensitivities, such as wheel spoke surfaces.

As discussed above, since upper wheel drag forces are leveraged against the axle—thereby magnifying the propulsive counterforce required at the axle—an increase in drag force on the wheels generally retards vehicle motion much more rapidly than does an increase in other vehicle drag forces. And while under external headwind conditions, the total drag on a vehicle with wheels exposed directly to headwinds increases still more rapidly with increasing vehicle speed.

Shielding upper wheel surfaces effectively lowers the elevation of the point on the wheel where the effective net drag force is exerted, thereby diminishing the magnifying effect of the propulsive counterforce required at the axle, as discussed above. As a result, the reduction in drag force upon the vehicle achieved by shielding the upper wheel surfaces is comparatively even more significant with increasing external headwinds. Shielding these upper wheel surfaces can thereby improve relative vehicle propulsion efficiency under headwinds by an even greater margin than under null wind conditions.

Moreover, shielding these upper wheel surfaces can be particularly beneficial to spoked wheels, as round spokes can have drag sensitivities many times greater than that of more streamlined surfaces. As round spokes—in some configurations—can have drag coefficients ranging from one to two orders of magnitude greater than corresponding smooth, streamlined surfaces, shielding the spokes of the upper wheel from external wind becomes particularly crucial in reducing overall drag upon the wheel.

Accordingly—given these multiple factors—a relatively small streamlined fairing attached to the vehicle structure and oriented to shield the upper surfaces of the wheel assembly from oncoming headwinds substantially reduces drag upon the wheel, while minimizing total drag upon the vehicle. Consequently, an embodiment includes the addition of such a fairing to any wheeled vehicle—including vehicles having spoked wheels, where the potential drag reduction can be even more significant.

The addition of such minimal fairings to each side of a traditional spoked bicycle wheel, for example, reduces windage losses and improves propulsive efficiency of the bicycle, particularly at higher cycle speeds or in the presence of headwinds, while minimizing cycle instability due to crosswind forces. Since crosswinds are a significant factor restricting the use of larger wheel covers, minimizing the fairing size is also an important design consideration. And minimizing form drag induced by the forward-facing profile of the fairing also will influence the fairing design. The preferred fairing size will likely substantially cover the upper section of the exposed wheel, and be placed closely adjacent to the wheel surfaces, consistent with general use in bicycles. In heavier or powered cycles, design considerations may permit somewhat larger fairings, covering even more of the wheel surfaces.

As shielding upper wheel surfaces can reduce overall drag on the vehicle, while simultaneously augmenting the total frontal profile area of the vehicle exposed to headwinds, a natural design constraint emerges from these competing factors: Shields should be designed sufficiently streamlined and positioned sufficiently close to wheel surfaces to provide reduced overall vehicle drag. And as shielding effectiveness potentially increases under headwind conditions, shields designed with larger surface areas and larger frontal profiles may still provide reduced overall vehicle drag under headwind conditions, if not under null wind conditions. Thus, a range of design criteria may be applied to selecting the best configuration and arrangement of the fairing, and will likely depend on the particular application. In any particular application, however, the embodiment will include a combination of design factors discussed above that will provide a reduction in overall vehicle drag.

In a cycle application, for example, fairings positioned within the width of the fork assembly will likely provide the most streamlined design which both shields spokes from headwinds but also minimizes any additional form drag profile area to the vehicle frame assembly. In other applications, insufficient clearances may preclude positioning the fairings immediately adjacent to moving wheel surfaces. In such situations, headwinds may be sufficient in magnitude to cause a reduction in overall vehicle drag to justify the use of wider upper wheel fairings—positioned largely outside the width of the fork assembly—with extended forward profile areas.

Furthermore, from the previous analysis a consideration the drag torque curves wholly above the level of the axle, it becomes apparent that shielding the wheel is best centered about an elevation likely between 75 and 80 percent of the diameter of the wheel, or near the center of the area under the unshielded torque curve shown in FIG. 18. While drag forces are generally greatest in magnitude near the top of the wheel, the effective exposed topmost surface areas are much smaller, thereby limiting the magnitude of drag torques upon the uppermost surfaces of the wheel. Thus, the upper wheel fairing would best extend above and below this critical level (generally, between 75 and 80 percent of the diameter of the wheel) in order to optimally minimize drag upon the wheel. And as the surfaces forward of the axle are the first to be impacted by headwinds, shielding these surfaces is essential to deflecting headwinds from the rearward surfaces. Thus, the higher-sensitivity drag-inducing surfaces in the forward upper quadrant and centered about this critical elevation on the wheel generally need to be shielded for optimal minimization of drag. These higher-sensitivity drag-inducing surfaces generally centered about this critical elevation and extending to include those surfaces with higher drag-inducing sensitivities that are positioned mostly in the forward upper quadrant of the wheel, but likely also to include much of the wheel surfaces positioned in the rearward upper quadrant, are herein defined and later referred to as: major upper drag-inducing surfaces. And the critical level about which the major drag-inducing surfaces are generally centered in elevation is herein defined and later referred to as: critical elevation.

As discussed, the precise elevation about which the major upper drag-inducing surfaces are centered, as well as the precise extent to which surfaces in the forward quadrant and in the upper half of the wheel central structure are included in the major upper drag-inducing surfaces, will depend on the particular application and operating conditions. Certain wheel surfaces with higher drag sensitivities, such as wheel spokes, generally need to be shielded when positioned within the region of the major upper drag-inducing surfaces. Other surfaces such as smooth tire surfaces having lower drag sensitivities may also benefit from shielding if their surface areas are extensive, are positioned near the critical level in elevation, or are the primary upper wheel surfaces exposed to headwinds. In the example analysis of FIGS. 17 and 18, a uniform surface across the wheel having a constant drag-sensitivity was assumed. In any particular application, the unique combination of different wheel surfaces with differing drag sensitivities will determine the particular height of the critical elevation level about which the major upper drag-inducing surfaces are centered.

A similar analysis can be performed for form drag forces on the moving forward vertical profiles of the wheel rim or tire. The results obtained are generally similar in form, though may differ somewhat in magnitudes as the effective wind speeds on the moving profiles are generally lower on the upper wheel—equal to the vehicle speed—and will depend on the particular application, including the total area of the wheel forward profile exposed to headwinds, and to headwind and vehicle speeds. Nevertheless, the net pressure drag torque caused by the moving outline of the wheel is also centered above the level of the axle, and thereby merits consideration in determining the particular height of the critical elevation level, and in the ultimate configuration of the fairing.

Hence, the fairing shown in FIG. 1 is best configured to shield the uppermost and forward wheel surfaces, and to extend rearward to at least partially shield the forward profile of the trailing portion of the upper wheel rim, consistent with the further requirement to extend downward as much as practical to the level of the axle. As mentioned, crosswind considerations will also influence the ultimate configuration for a particular application.

In consideration of further embodiments described below, the operating principles described above will generally apply, and may be referred thereto.

Figure 2:
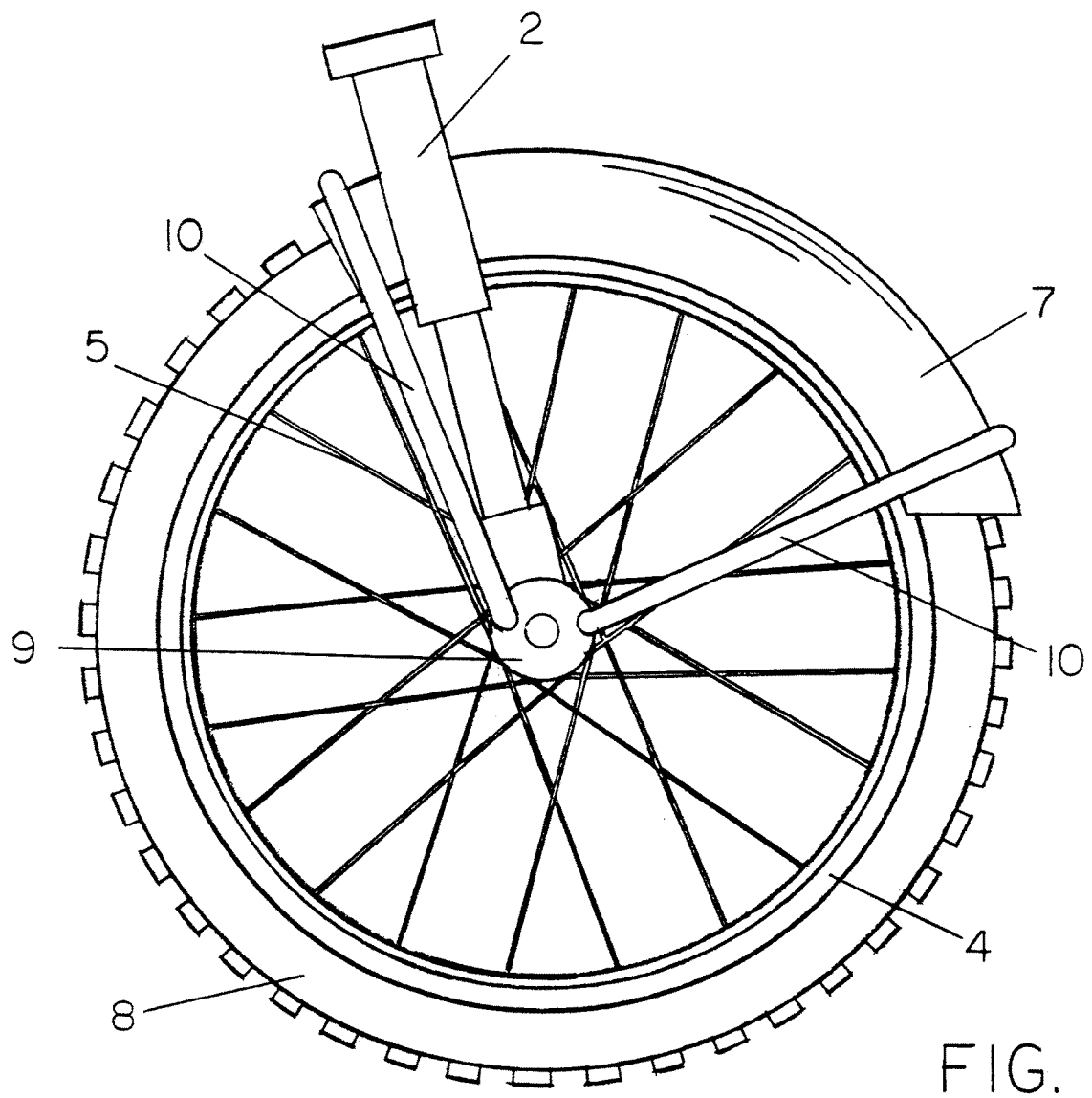
FIG. 2 is a front cycle wheel assembly, as typically found on a bicycle or motorcycle, where a fender is attached and positioned as shown to the fork assembly, thereby shielding the upper- and front-most surfaces of the tire and wheel rim from oncoming headwinds.

Second Embodiment—Description—FIG. 2

As shown in FIG. 2, a streamlined fender 7 is attached to the inside of the front-fork tube assembly 2 of a typical cycle having spoked wheels 4 with studded tires 8. The fender 7 is positioned closely adjacent to tire 8, covering the approximate upper and front-most quadrant of the tire 8, and is rigidly fixed to the stationary portion of axle assembly 9 using struts 10. The fender 7 has sufficient structural rigidity to allow close placement to tire 8, thereby minimizing any oncoming headwinds from leaking between tire 8 and fender 7.

With fender 7 configured in this way, the treads near the top of the tire 8 are shielded from headwinds. Shielded this way, the topmost surfaces of tire 8 are moving at an effective wind speed closer to the ground speed of the cycle, rather than moving with respect to the oncoming external wind at an effective speed of up to nearly twice the ground speed of the cycle. As a result, the aerodynamic drag forces exerted upon the upper treads of tire 8 are substantially reduced.

The reduction drag force has the greatest effect near the top of tire 8, where the surfaces of tire 8 are moving fastest with respect to external winds otherwise impinging thereupon. As the uppermost surfaces of tire 8 rotate away from the topmost point to an intermediate position with respect to either of two lateral midpoints on the tire 8, these drag forces are greatly reduced. Thus, the embodiment shown in FIG. 2 covers this critical uppermost and forward-oriented quadrant of tire 8, minimizing the addition of unnecessary weight and drag-inducing structure to the cycle.

Second Embodiment—Operation—FIG. 2

An embodiment including a forwardly oriented fender 7, shielding the uppermost outer surfaces of the tire 8 from oncoming headwinds, can offer not only similar aerodynamic benefits to fairing 1 of FIG. 1 in reducing frictional drag forces on tire surfaces, but can also substantially reduce form drag forces on the wheel's forwardly facing profiles.

As discussed above, both frictional and pressure drag forces can be shown to exert moments of force pivoting about the point of ground contact. And these forces are magnified against the propulsive force required at the axle. And as such, either type of drag force exerted upon the upper wheel retards vehicle motion considerably more than a similar force exerted either upon a lower surface of the wheel, or directly upon the frame or body of the vehicle. Minimizing these upper wheel drag forces is therefore critical to improving propulsive efficiency of the vehicle.

Fender 7 is an effective means to minimize both frictional drag forces on upper wheel surfaces, and pressure drag forces exerted on the upper wheel. Fender 7 shields tire 8 from headwinds and thereby reduces drag on surfaces of tire 8. Fender 7 also deflects headwinds from tire 8 and thereby shifts headwind form drag forces normally directed upon the upper wheel forward profile to be instead directed upon the vehicle frame. Thus, fender 7 reduces wheel form drag force (as well as tire frictional drag force) magnification effects significantly.

And similar to the first embodiment of FIG. 1, the optimum design for a particular headwind application will size fender 7 sufficiently extensive in frontal profile area to effectively shield tire 8 from headwinds, but sufficiently narrow to minimize any added form drag to the vehicle, and which will result in an overall reduction in vehicle drag. For certain wheels having tires with rough, high-drag sensitivity tread patterns, such a topmost and forwardly-oriented fender 7 can provide sufficient reduction in total upper tire drag to offset any added vehicle drag from the fender itself. In higher speed vehicles, particularly those having wider tires exposed directly to headwinds—such as certain jeep-type automobiles or trucks—using an upper and forwardly-oriented fender 7 to shield the upper wheel surfaces may offer dramatic reductions in vehicle drag.

Figure 3:
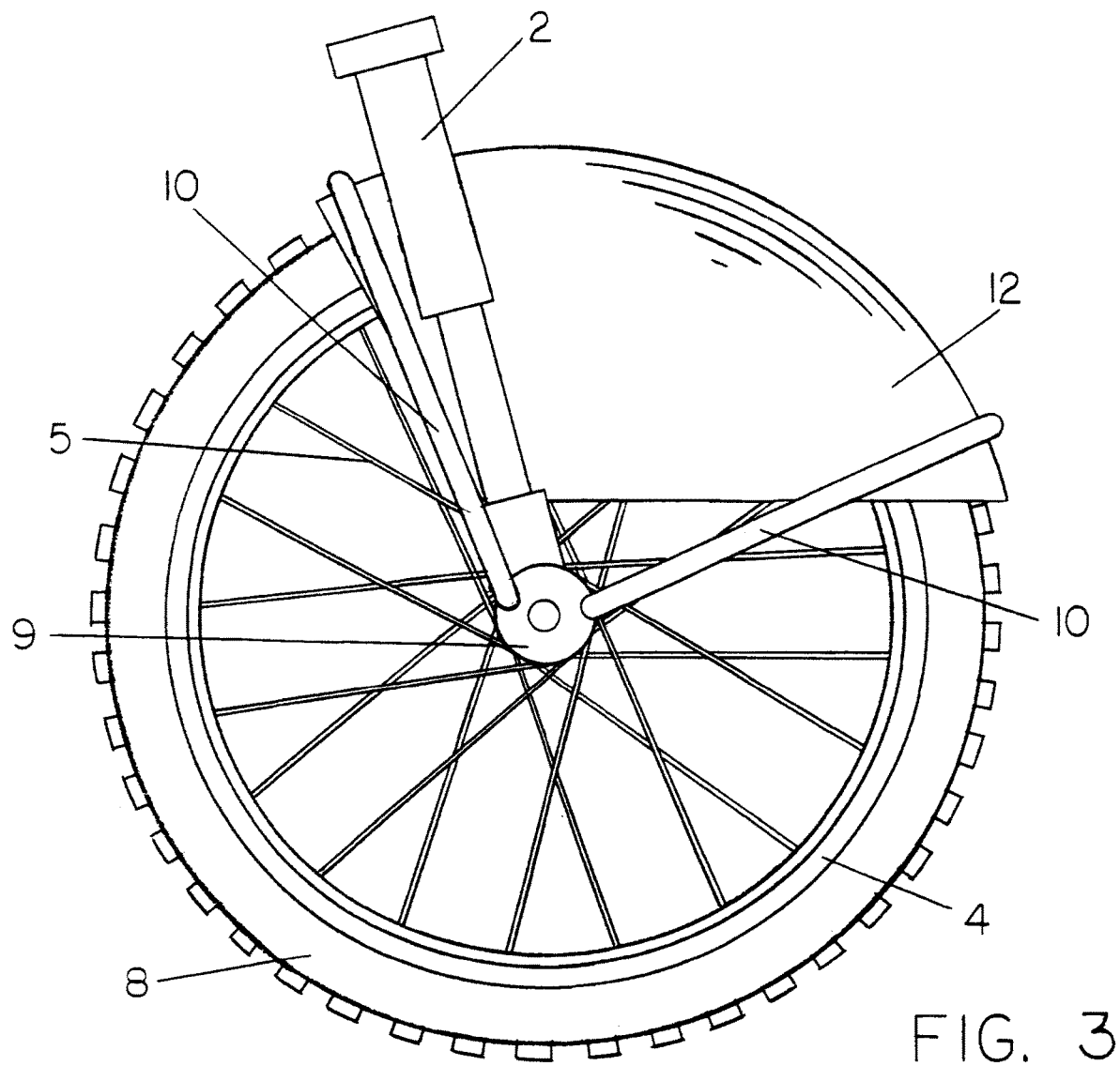
FIG. 3 is a front cycle wheel assembly, as typically found on a bicycle or motorcycle, where a combination fender and fairing assembly is attached and positioned as shown to the fork assembly, thereby shielding the upper- and front-most surfaces of the tire, wheel rim and spoked inner-wheel structure from oncoming headwinds.

Third Embodiment—FIG. 3

Similarly, as shown in FIG. 3, a streamlined combination fender and fairing assembly 12 is attached to the inside of front fork tube assembly 2 of a typical cycle having spoked wheels 4. The fender portion of the combination assembly 12 is positioned closely adjacent to the tire 8 covering the approximate upper and front-most quadrant of the tire 8. The fairing portions of the combination assembly 12 are positioned closely adjacent to the inner wheel structure of wheel 4 covering the approximate upper and front-most quadrant on each side of wheel 4. The combination assembly 12 is provided sufficient structural rigidity to allow close placement to wheel 4 and tire 8, thereby minimizing any oncoming headwinds from leaking either between tire 8 and the fender portion of the combination assembly 12, or between the inner structure of wheel 4 and the fairing portions of the combination assembly 12.

With the combination fender and fairing assembly 12 configured in this way, both the spokes 5 and the treads of tire 8 near the top of the wheel 4 are shielded from headwinds. And similar to the embodiments of FIG. 1 and FIG. 2, the aerodynamic drag forces exerted upon the topmost spokes 5 and the upper treads of tire 8 are substantially reduced, and thereby may offer dramatic reductions in vehicle drag.

In addition, however, including fairing assembly 12 in this embodiment provides an additional measure of profile shielding to the frontal area of the trailing upper section of wheel 4, thereby further reducing total wheel profile form drag. And similar to the second embodiment of FIG. 2, the optimum design for a particular headwind application will size combination fender and fairing assembly 12 sufficiently extensive in both frontal profile area and fairing size to effectively shield surfaces of wheel 4 and tire 8 from headwinds, but sufficiently narrow and compact in size to minimize any added drag to the vehicle, and which will result in an overall reduction in vehicle drag.

Figure 4:
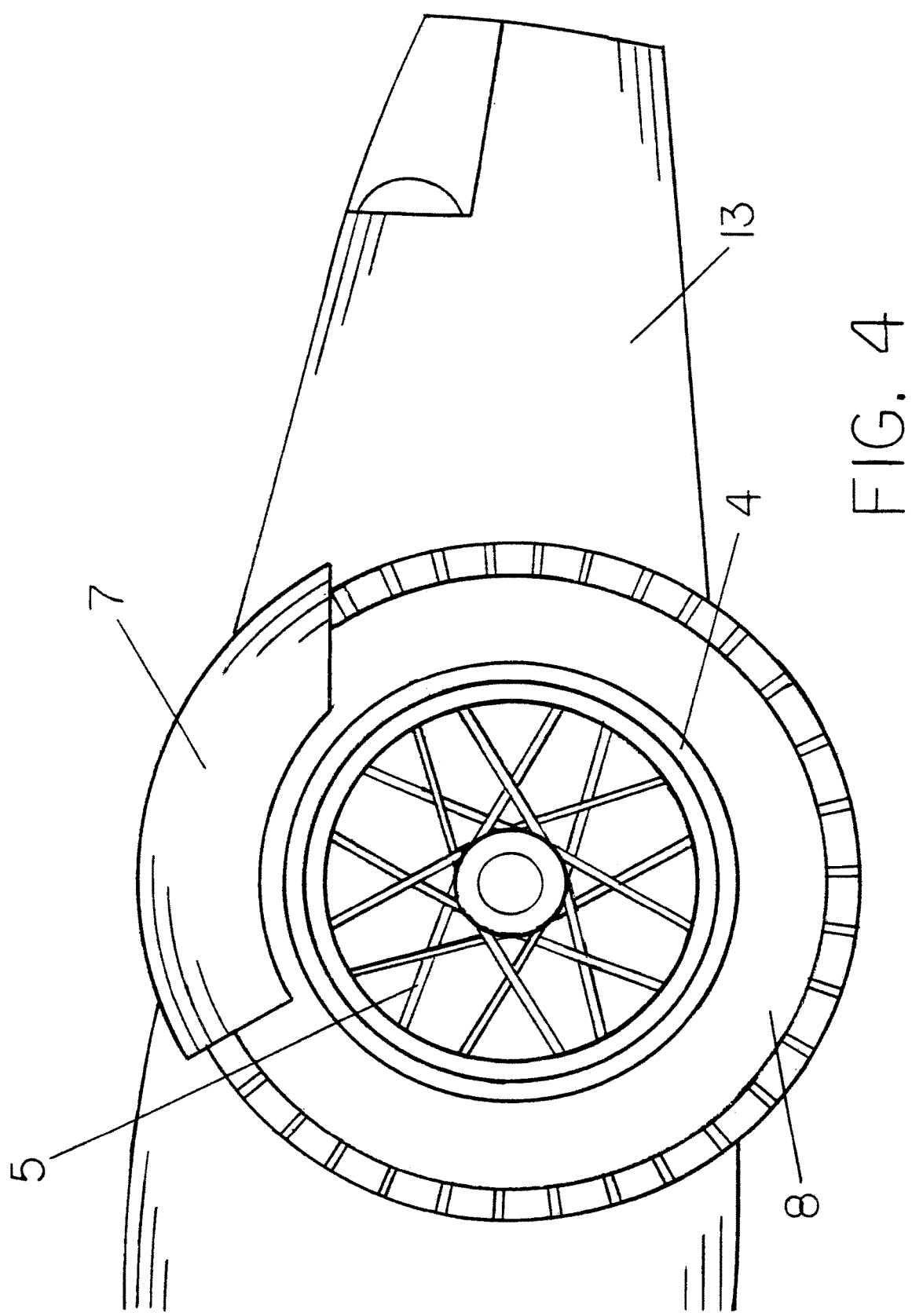
FIG. 4 is a vehicle wheel assembly, as typically found on a sports car, where a fender is attached and positioned as shown to the wheel suspension assembly, thereby shielding the upper- and front-most surfaces of the tire from oncoming headwinds.

Fourth Embodiment—FIG. 4

As shown in FIG. 4, a streamlined fender 7 is attached to a typical sports car 13 having otherwise exposed tires 8. The fender 7 is positioned closely adjacent to the tire 8, covering the approximate upper and front-most quadrant of tire 8. The fender 7 is attached either to the moving wheel suspension assembly of wheel 4, thereby minimizing any relative motion between the suspended wheel 4 and the fender 7, or directly to the body structure of car 13 with the wheel suspension displacement range substantially constrained. The fender 7 is provided sufficient structural rigidity to allow close placement to tire 8, thereby minimizing any oncoming headwinds from leaking between tire 8 and fender 7.

With fender 7 configured in this way, the tread near the top of tire 8 is shielded from headwinds. And similar to the embodiment of FIG. 2, the aerodynamic drag forces exerted upon the upper surfaces of tire 8 are substantially reduced, and thereby may offer dramatic reductions in vehicle drag.

Figure 5:
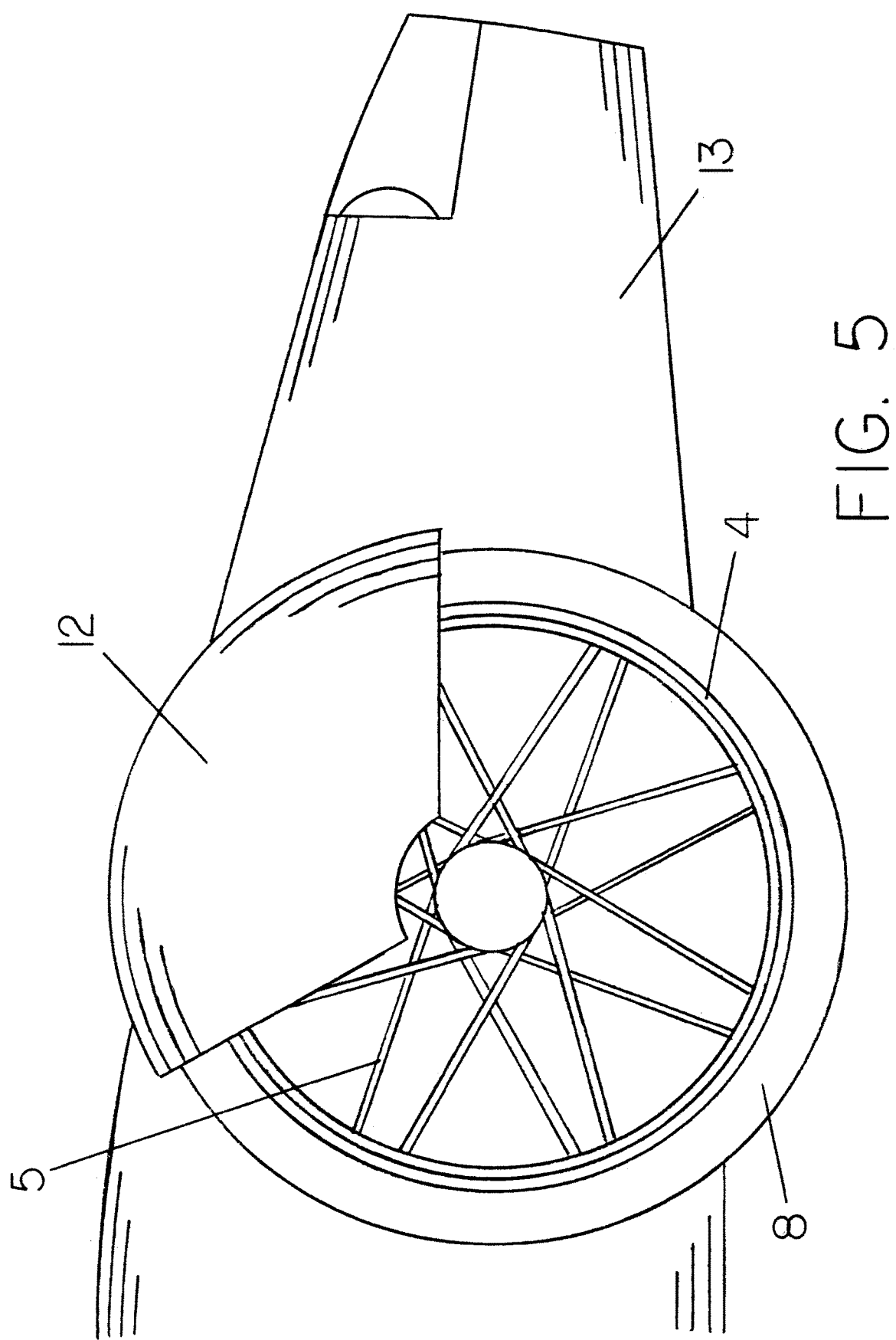
FIG. 5 is a vehicle wheel assembly, as typically found on a sports car, where a fender and fairing assembly is attached and positioned as shown to the wheel suspension assembly, thereby shielding both the upper- and front-most surfaces of the tire, and the upper inner-wheel structure from oncoming headwinds.

Fifth Embodiment—FIG. 5

As shown in FIG. 5, a streamlined combination fender and fairing assembly 12 is attached to a typical sports car 13 having otherwise exposed tires 8 and spoked wheels 4. The fender portion of the combination assembly 12 is positioned closely adjacent to the tire 8 covering the approximate upper and front-most quadrant of the tire 8. The combination assembly 12 is attached either to the moving wheel suspension assembly of wheel 4, thereby minimizing any relative motion between suspended wheel 4 and combination assembly 12, or directly to the body structure of car 13 with the wheel suspension displacement range substantially constrained. The fairing portions of combination assembly 12 are positioned closely adjacent to the inner wheel structure of wheel 4 covering the approximate upper and front-most quadrant on each side of wheel 4. The combination assembly 12 is provided structural rigidity sufficient to allow close placement to wheel 4 and tire 8, thereby minimizing any oncoming headwinds from leaking either between tire 8 and the fender portion of combination assembly 12, or between the inner structure of wheel 4 and the fairing portions of combination assembly 12.

With the combination fender and fairing assembly 12 configured in this way, both the spokes 5 and the treads of tire 8 near the top of the wheel 4 are shielded from headwinds. And similar to the embodiment of FIG. 3, the aerodynamic drag forces exerted upon the upper spokes 5 and the upper surfaces of tire 8 are substantially reduced, and thereby may offer dramatic reductions in vehicle drag.

Figure 6:
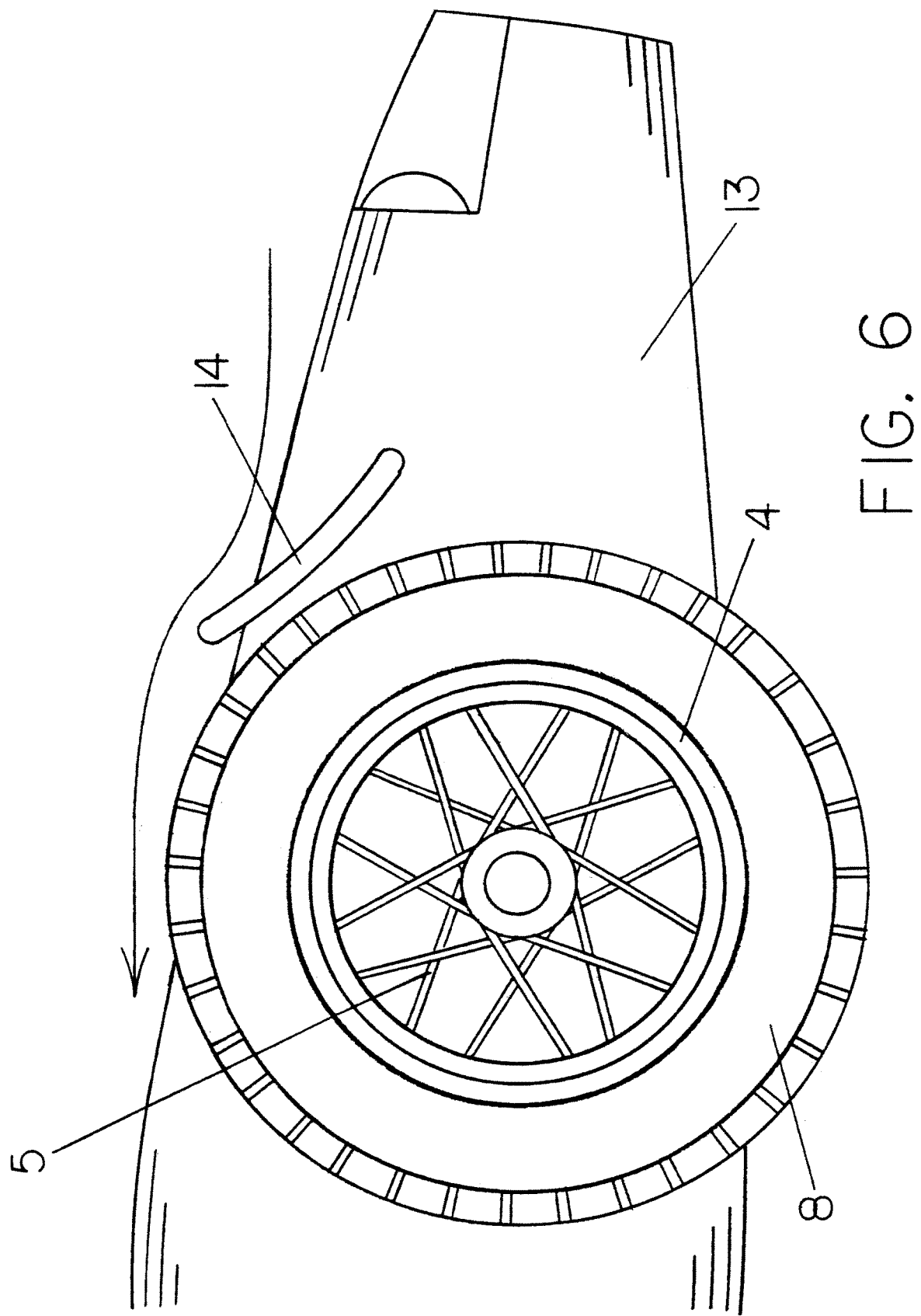
FIG. 6 is a vehicle wheel assembly, as typically found on a sports car, where a fairing assembly is attached either to the wheel suspension assembly or to the car body structure, and positioned as shown, deflecting upward any wind impinging thereon, and thereby shielding both the upper- and front-most surfaces of the tire from oncoming headwinds.

Sixth Embodiment—Description—FIG. 6

As shown in FIG. 6, a streamlined wind-deflecting fairing 14 is shown attached to a typical sports car 13 having otherwise exposed tires 8. The wind-deflecting fairing 14 is positioned slightly forward and closely adjacent to the tire 8, shielding the approximate upper front-most quadrant of tire 8 from headwinds. The wind-deflecting fairing 14 is attached either to the moving wheel suspension assembly of wheel 4, thereby minimizing any relative motion between the suspended wheel 4—and tire 8—and wing fairing 14, or directly to the body structure of car 13 with the wheel suspension displacement range substantially constrained. The wind-deflecting fairing 14 is designed with minimal surface area, but with sufficient area to deflect headwind from otherwise impinging upon the upper surfaces of tire 8.

With wind-deflecting fairing 14 configured in this way, the tread near the top of tire 8 is shielded from headwinds. And similar to the embodiments of FIGS. 2, 3, 4 and 5, the aerodynamic drag forces exerted upon the upper surfaces of tire 8 are substantially reduced, and thereby may offer dramatic reductions in vehicle drag.

Sixth Embodiment—Operation—FIGS. 6 and 25

As indicated above, a countervailing ground reaction-force (R, as shown in FIG. 25) opposing vehicle forward motion is naturally developed upon the wheel, primarily in response to the upper-wheel drag forces. This reaction force is transmitted to the wheel through frictional ground contact with the tire. As the net drag force grows generally with the square of the average effective wind speed upon the wheel, these frictional ground contact forces increase in similar proportion.

As a result, proportional down-forces must somehow be developed upon the wheel in order to maintain firm contact with the ground, preventing tire skidding and loss of vehicle control. These down-forces are generally developed using drag-inducing wings and body moldings on the vehicle, often greatly reducing the propulsive efficiency of the vehicle.

Introducing wind-shielding fairings to the upper wheel areas can reduce both the drag forces acting thereon, and the drag inducing down-forces needed to maintain firm ground contact. And the use of a minimal wind-deflecting fairing that also provides a measure of down-force can be particularly beneficial in high-speed vehicle applications. Thus, the use of minimal wind-deflecting upper wheel fairings can further improve both the propulsive efficiency and directional stability of many higher-speed vehicles.

Figure 7:
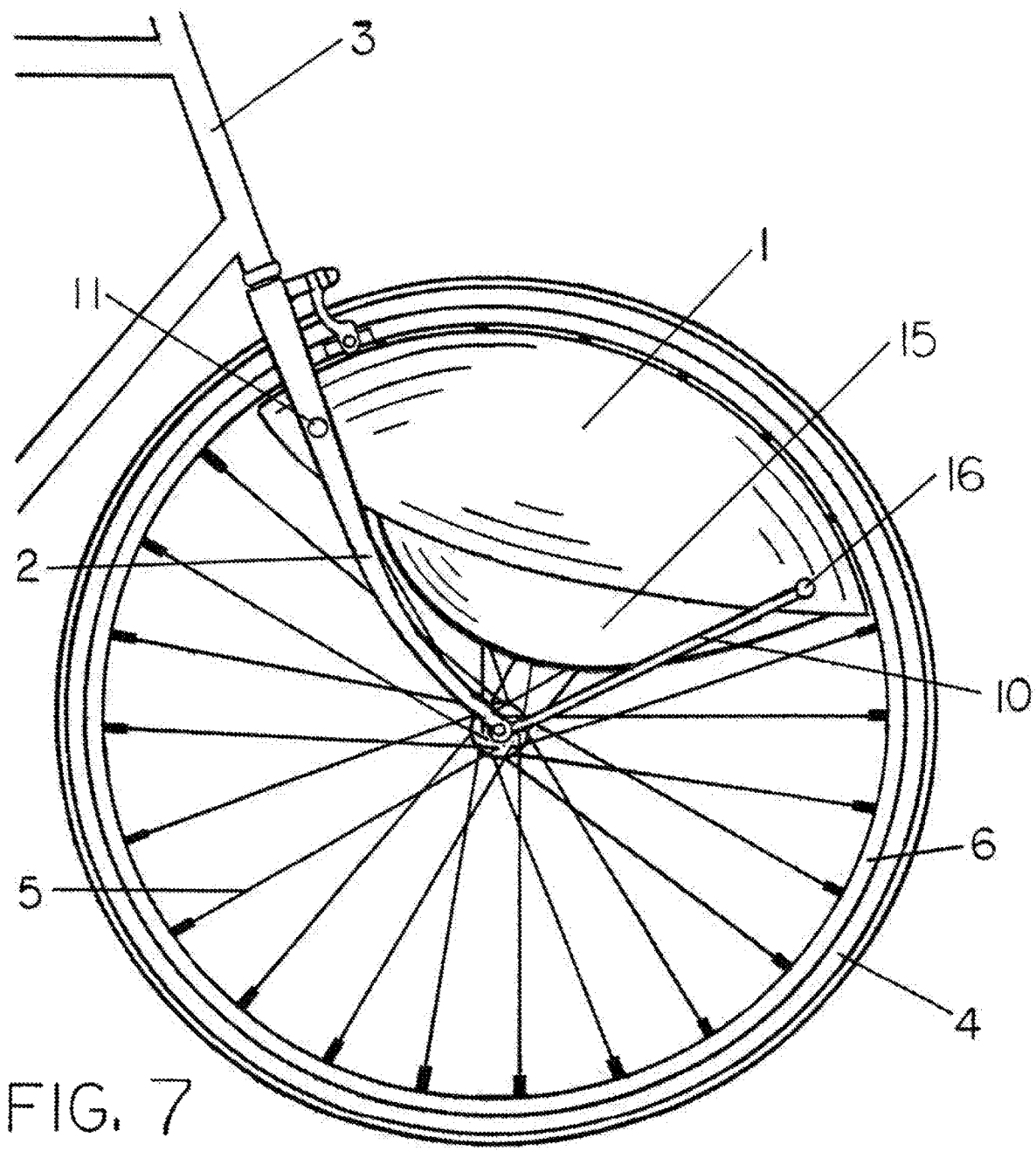
FIG. 7 is a front cycle wheel assembly, as typically found on a bicycle or motorcycle, where a fairing is attached and positioned as shown to each side of the fork assembly, and where said fairing includes a movable lower section, which may be adjusted to expand or collapse the total surface area of the fairing to accommodate a range of crosswind conditions.

Seventh Embodiment—Description—FIG. 7

In FIG. 7, a streamlined fairing 1 is shown as in FIG. 1, but includes an adjustable fairing section 15 pivoting at attachment point 16, whereby the total effective area of the combined fairing assembly—shielding the wind from wheel surfaces—can be adjusted to accommodate different cross-wind conditions.

Seventh Embodiment—Operation—FIG. 7

A further embodiment may include adjustable means for varying the exposed surface area of the fairing 1, thereby providing adjustment to the effective shielding of the wheel 4 from oncoming headwinds. Such a fairing mounted on a bicycle, for example, could be collapsed under high cross-wind conditions for minimal exposed area, covering only the very topmost surfaces of the wheel, and thereby minimizing potential crosswind forces directed upon the wheel. Under normal wind conditions, the fairing could be extended, covering more of the critical upper-wheel surfaces, thereby maximizing propulsive efficiency.

Adjustable fairing means could also include streamlined holes or slots in the fairing, arranged for minimal drag, but otherwise enabling some crosswinds to penetrate the fairing. While some loss in potential reduction in drag may result from utilizing such perforated means in the fairing, under higher crosswind conditions this configuration may become desirable.

Finally, and particularly for higher speed applications, automatic means for adjustment of the fairing area could be provided to automatically optimize the exposed fairing area for changing operating conditions.

Eighth Embodiment—Description—FIGS. 8, 9, 10, 11, 12 and 13

Figure 10:
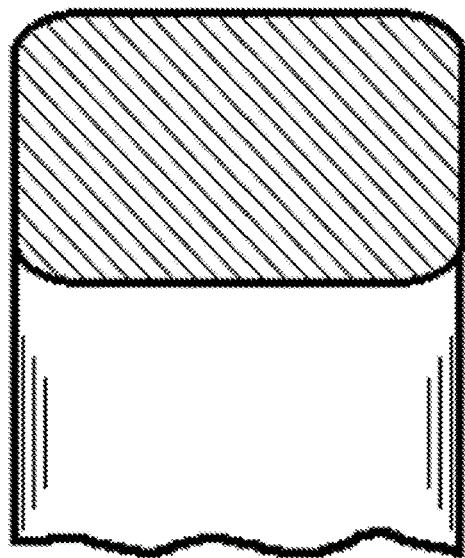
FIG. 10 shows the drag-inducing, rectangular cross-sectional profile typical of prior-art spokes used in automotive wheels, as illustrated in FIGS. 8 and 9.
Figure 11:
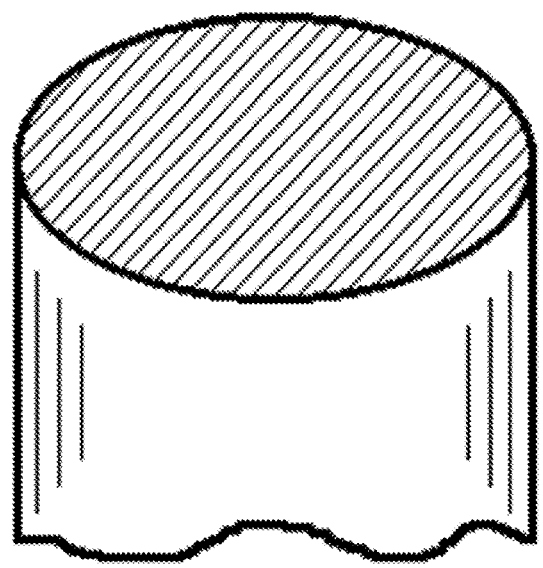
FIG. 11 shows the streamlined, drag-reducing, oval-shaped cross-sectional profile of a spoke to be used in one or more of the embodiments, including automotive wheels.
Figure 12:
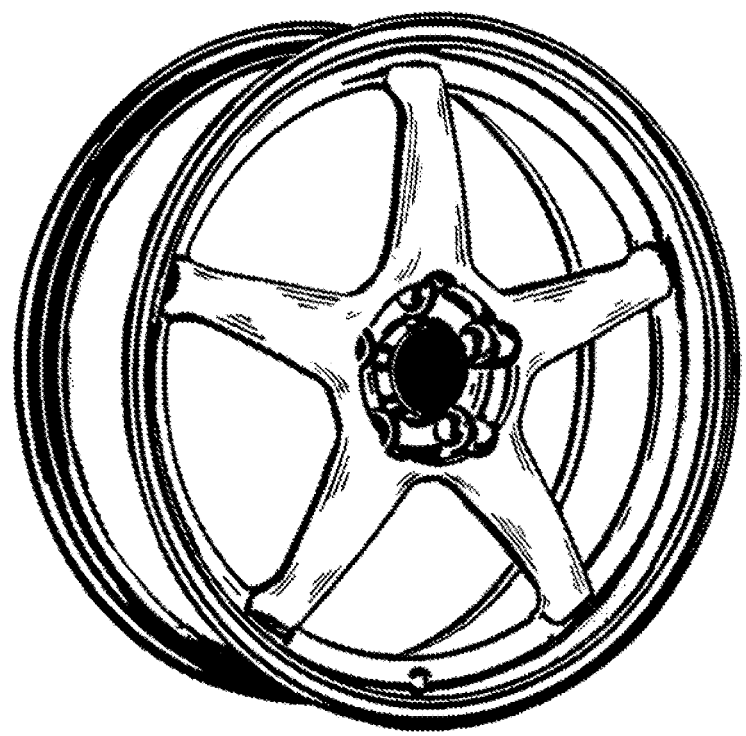
FIG. 12 shows an automotive wheel with these streamlined, drag-reducing, oval cross-sectional shaped spokes, thereby reducing drag on critical rotating wheel surfaces.
Figure 13:
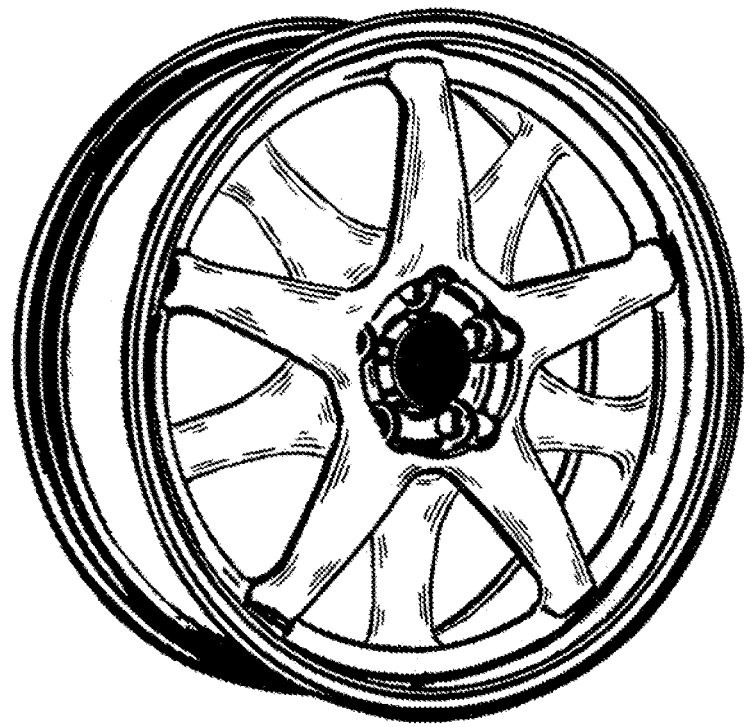
FIG. 13 shows an automotive wheel with these streamlined, drag-reducing, oval cross-sectional shaped spokes, thereby reducing drag on critical rotating wheel surfaces. Two rows of spokes are shown, slightly offset axially from each other, thereby increasing the strength of the wheel in the transverse direction.

In FIGS. 8 and 9, several examples of prior-art wheels typically found on high-performance automobiles are shown, having outwardly oriented square-profile spokes, which are generally exposed to headwinds. The square cross-sectional profile of prior art spokes is shown in FIG. 10. The streamlined cross-sectional oval profile of the embodiment spokes is shown in FIG. 11. FIG. 12 shows an example of a wheel with generally oval cross-sectional spokes. FIG. 13 shows an example of a wheel with generally oval cross-sectional spokes where the spokes are shown in two rows, one row being offset more toward the inside of the wheel, thereby increasing the strength of the wheel in the axial direction.

Eighth Embodiment—Operation—FIGS. 8, 9, 10, 11, 12, 13 and 33

Square spokes have higher sensitivity to drag than either round or more streamlined oval-shaped spokes. Given the importance—established above—of reducing the drag on rotating wheel surfaces over that on other vehicle surfaces, it becomes evident that considerable effort should be given to reducing spoke drag on high-speed wheels.

Thus, an embodiment includes the use of tapered, generally oval-shaped spokes on automotive wheels, especially on wheels with spokes directly exposed to headwinds. For example, the use of an oval-profiled spoke with a two-to-one dimensional ratio may reduce drag by a factor of two or more, over a similar square-profile spoke. And further streamlining the spoke can reduce drag sensitivity even more.

Figure 33:
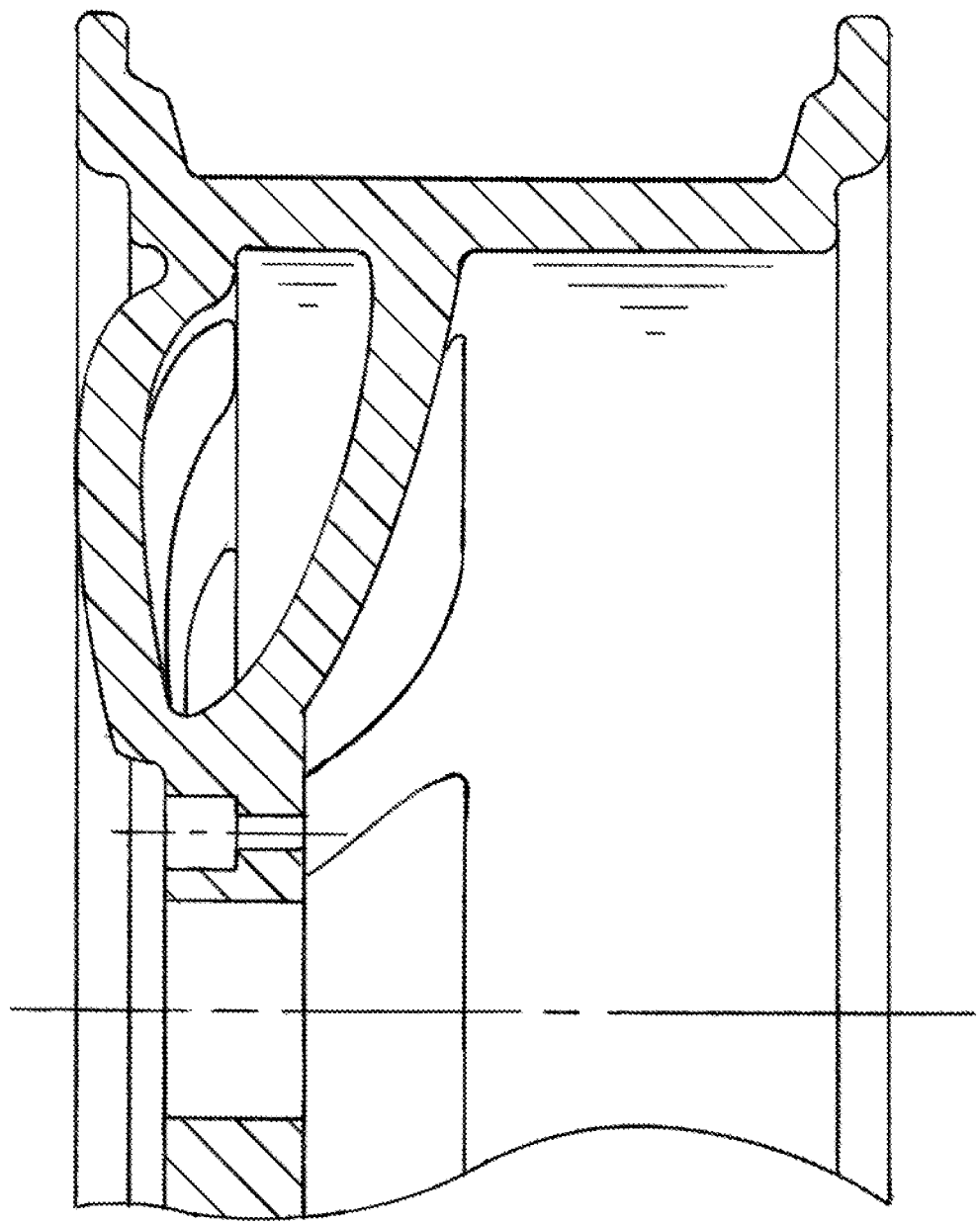
FIG. 33 shows a cross section of one-half of an automotive wheel assembly having nonparallel rows of aerodynamic spokes for strengthening the wheel in the axial direction.

As axial forces upon the wheel are transmitted more efficiently with spokes having square profiles than with streamlined spokes, streamlined designs for automotive spokes may have been largely overlooked. Streamlined oval profiled spokes can provide sufficient axial strength by offsetting the streamlined spokes in the axial direction within the wheel as shown in FIG. 13, and by providing a nonparallel arrangement between the offset rows of spokes as shown in FIG. 33. Using a relatively thin streamlined spoke, in nonparallel arrangement with other similar spokes offset axially (and likely circumferentially) within the wheel, adequate axial structural rigidity can be obtained.

The reduced drag sensitivity of the streamlined spoke used in high-speed automotive wheels can significantly improve vehicle performance—reducing fuel consumption—and traction, especially at higher vehicle speeds and under headwind conditions.

Figure 14:
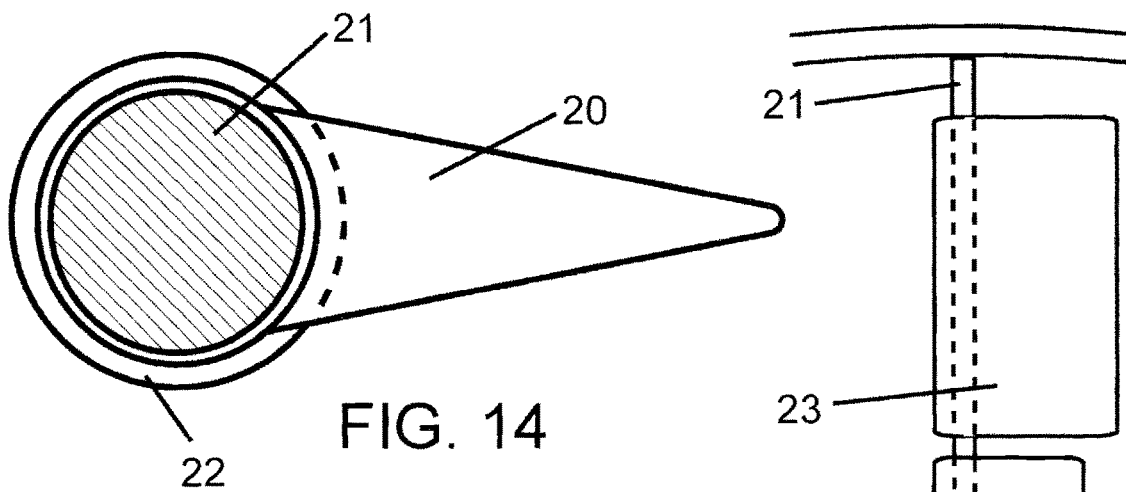
FIG. 14 shows the tapered, drag-reducing cross-sectional profile of a spoke fin installed on a typical round wire spoke, where the spoke fin is free to swivel about the spoke and thereby to adjust to varying crosswind influences as the wheel rotates.
Figure 15:
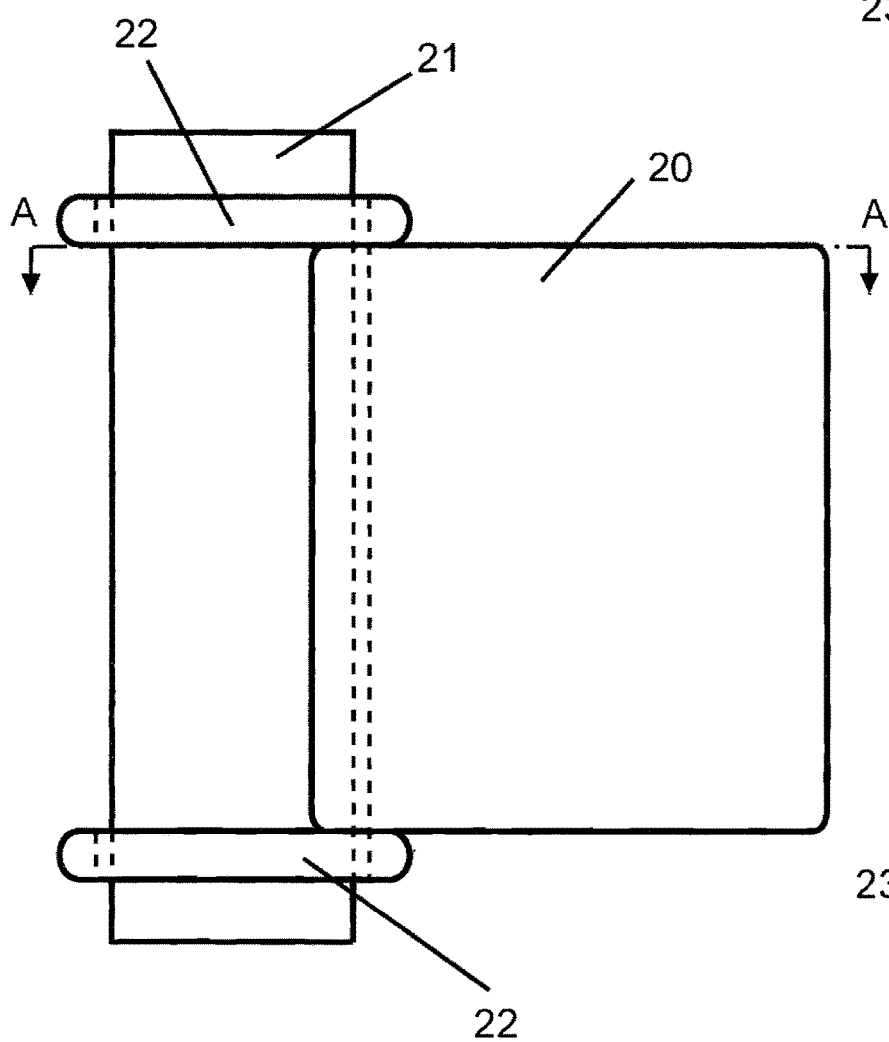
FIG. 15 shows a short section of the tapered, drag-reducing fin installed on a typical round wire spoke, where the spoke fin is free to swivel about the spoke and thereby to adjust to varying crosswind influences as the wheel rotates.
Figure 16:
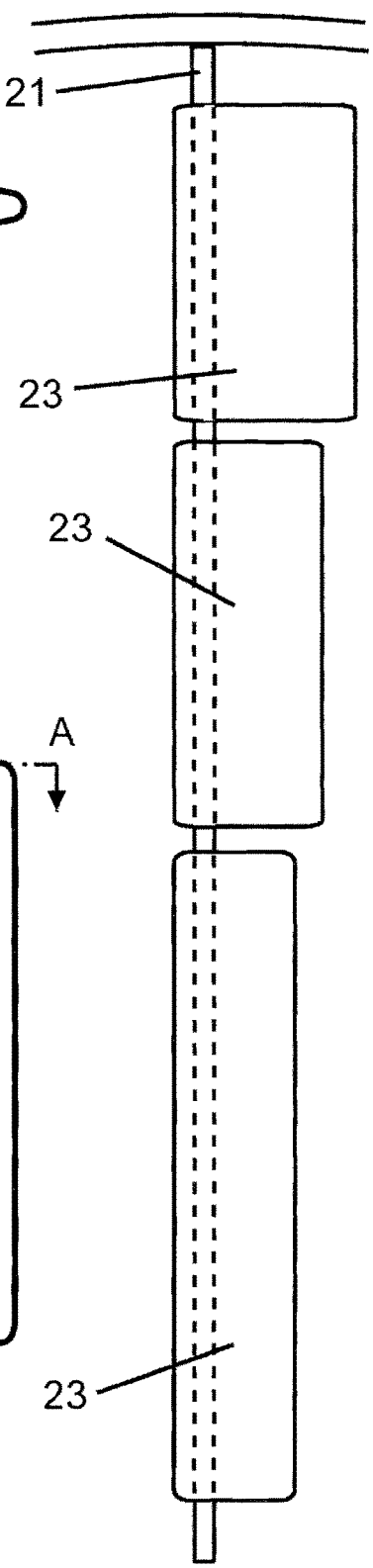
FIG. 16 shows several sections of spoke fins installed on a typical round wire spoke, where each spoke fin is free to swivel about the spoke independently, and thereby to adjust to varying crosswind influences as the wheel rotates. This fin design could also be used on a vehicle radio antenna, reducing drag and thereby improving fuel consumption for vehicles, especially when operating at highway speeds.
Figure 17:
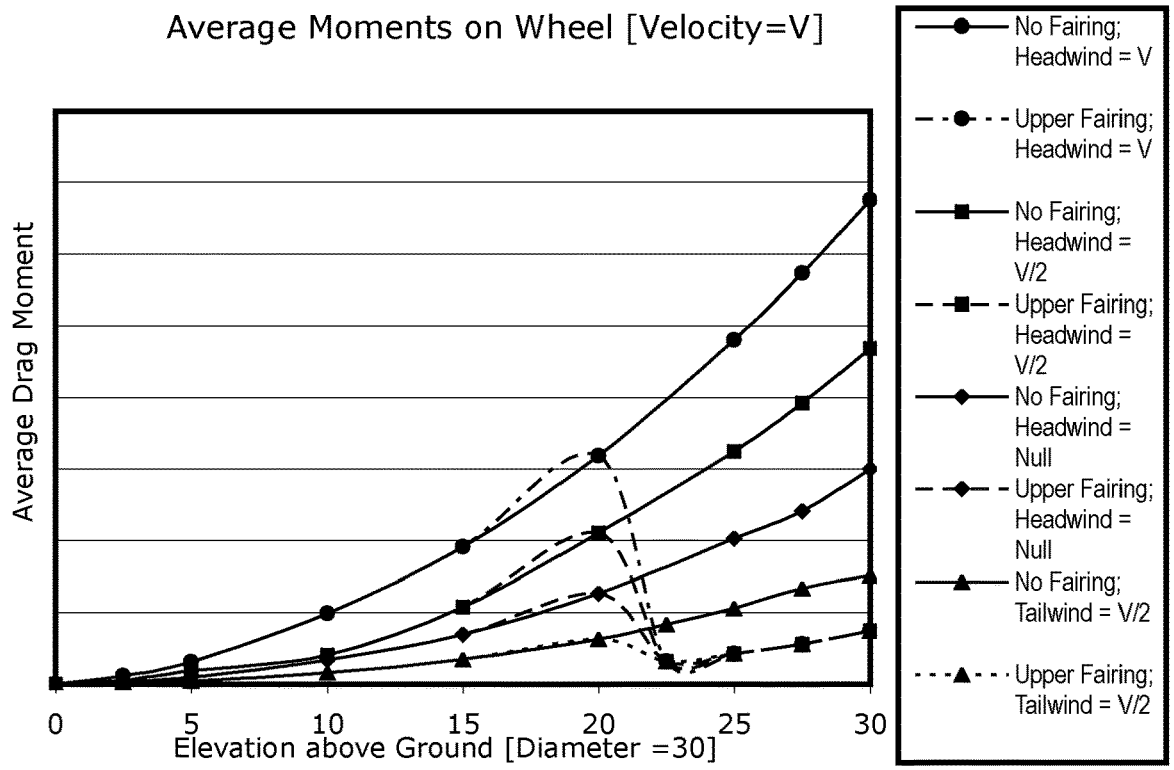
FIG. 17 shows a plot of calculated average moments—about the ground contact point—of drag force, that are exerted upon rotating wheel surfaces as a function of the elevation above the ground. The relative drag forces are determined from calculated wind vectors for the rotating surfaces on a wheel moving at a constant speed of V, and plotted for several different wind and wheel-surface shielding conditions. Specifically, relative magnitudes in average drag moments about the ground contact point as a function of elevation are plotted, for eight conditions: comparing with (dashed lines) and without (solid lines) shielding covering the upper third of wheel surfaces, for tailwinds equal to half the vehicle speed; for null headwinds; for headwinds equal to half the vehicle speed; and for headwinds equal to the vehicle speed. The rising solid curves plotted show the highest moments to be near the top of the wheel, while the dashed curves show the effect of the upper shield in substantially reducing the average drag moments on the rotating wheel.

Ninth Embodiment—Description—FIGS. 14, 15 and 16

In FIG. 14, a streamlined spoke tailfin 20 is installed over a round wire spoke 21—shown in cross-section A-A of FIG. 15—typically used on a cycle. Pivoting rings 22 affixed to tailfin 20 enable tailfin 20 to swivel about the spoke 21, and thereby permitting tailfin 20 to automatically adjust its orientation in response to varying crosswinds. In FIG. 15, the wider profile of the spoke tailfin 20 is shown rotatably attached to spoke 21. In FIG. 16, several spoke tailfin covers 23 of different sizes—shown in the configuration of a cover but similar in streamlined profile to tailfin 20 shown in FIG. 14—are shown installed on a spoke 21. The tailfin cover 23 includes a through-hole containing spoke 21 within its length, enabling the tailfin cover 23 to swivel about spoke 21, and thereby permitting tailfin cover 23 to automatically adjust its orientation in response to varying crosswinds.

Ninth Embodiment—Operation—FIGS. 14, 15 and 16

The streamlined profile of the swiveling spoke tailfin may offer greatly reduced drag over round spokes, without the potential increase in drag sensitivity of bladed spokes exposed to crosswinds. Use of the streamlined spoke tailfin may reduce drag sensitivity of the round spoke considerably, in some instances by up to a factor of 10.

Eliminating crosswind turbulence upon the streamlined profile is essential to minimize drag on the spokes under crosswind conditions. The relative crosswind-to-headwind vector directed on a point on the wheel varies significantly with wheel rotation. Near the top of the wheel, headwinds are strongest, and any relative crosswinds are less significant. Near the bottom of the wheel, headwinds are minimized and crosswinds are thereby more significant relative sources of drag on the wheel surfaces. Allowing the spoke tailfin to swivel enables the tailfin to adjust to immediate relative crosswinds, which can vary continually with the rotation of the wheel.

The spoke tailfin can be designed either to extend the entire length of the spoke, or to extend over only a portion of the spoke, such as over the outermost section of the spoke nearest the rim, which moves fastest near the top of the wheel, and is thereby exposed to the fastest headwinds.

Alternatively, the spoke tails may be divided in several independent sections along the length of the spoke, allowing independent adjustment to the varying crosswind components along the radial direction of the wheel. And these tailfin sections can be different in both size and configuration, to best minimize drag, as shown in FIG. 16. For example, tailfin sections nearest the rim—at the top in FIG. 16—are exposed to the faster headwinds and may be designed for more extensive streamlining, while sections closer to the hub—at the bottom in FIG. 16—being exposed to slower headwinds and greater relative crosswind vector components, may be designed more compactly for more rapid re-orientation. Or the tailfin could be configured with a tapered cross-sectional profile similar in form to the tapered spoke embodiment, described below and referenced in FIGS. 19, 20, 21, 22 and 23, which varies along its entire length.

While shielding the spokes with a fairing is an effective means of reducing drag due to headwinds, drag induced solely from winds due to wheel rotation remains largely unaffected. Indeed, the spokes on the lower half of the wheel are relatively less affected by headwinds, and are more affected by the vector components of wind due to wheel rotation. Using streamlined spoke tailfins, drag on the lower spokes can also be reduced. Moreover, swiveling spoke tailfin covers used in conjunction with upper wheel fairings can offer significant reduction in overall drag upon the wheel—and thereby on the vehicle—while minimizing sensitivity to crosswinds.

Tenth Embodiment—Description—FIGS. 19, 20, 21 22 and 23

In FIGS. 19 and 20, a streamlined spoke for use in racing-style bicycle wheels, tapers in the broader width from the wheel rim to the wheel hub. In FIG. 21, the profile—shown in cross-section—of the more streamlined end of the spoke is shown. The spoke profile varies along the length of the spoke—from rim to hub—with the more thin and streamlined part nearest the rim and the more circular part nearest the hub. In FIG. 22, the profile—shown in cross-section—of the middle of the spoke is shown. In FIG. 23, the profile—shown in cross-section—of the end of the spoke nearest the wheel hub is shown.

The profile is shaped to maintain a generally constant total area in cross-section, in order to retain a relatively constant tensile strength along the full length of the spoke. The spoke profile may include cross-sectional areas varying somewhat along the spoke length, typically with larger areas nearest the ends of the spoke to enhance strength near attachment points. Nearest the wheel rim, the streamlined profile is more elliptical (or flat like a blade or thin wing), as shown in FIG. 21, while nearest the hub the profile becomes more closely circular—as shown in FIG. 23. While the general trend for tapering the spoke is as shown, the particular application will determine just how thin and wide the spoke is near the rim, and how more oval or circular the spoke cross-sectional profile becomes near the hub.

Tenth Embodiment—Operation—FIGS. 19, 20, 21 22 and 23

Streamlined spokes reduce drag upon the wheel in the presence of direct headwinds.

A crosswind directed upon the wheel can cause turbulence across the broad face of the streamlined spoke, quickly increasing drag thereon. Eliminating crosswind turbulence upon the streamlined profile is essential to minimizing drag under crosswind conditions. The design challenge becomes to minimize drag through spoke streamlining over the widest range of crosswind conditions; too wide a blade design can exacerbate drag under even minimal crosswinds, thereby negating any advantage of the streamlined spoke profile.

Notably, the relative crosswind-to-headwind vector component varies significantly depending on the relative location on the wheel. Near the top of the wheel, headwinds are strongest, and any relative crosswinds are less significant. Near the bottom of the wheel, headwinds are minimized and crosswinds are more significant. Thus, crosswinds can be a more significant relative source of drag on wheel surfaces closer to the ground.

The broader width of the bladed spoke provides greater streamlining for the higher speed headwinds near the top of the wheel, thereby minimizing drag on these critical drag-inducing surfaces. Any turbulence from the relatively smaller crosswind components directed upon the faster moving uppermost portion of the bladed spokes is generally minimized. The same crosswinds directed upon slower moving spoke surfaces near the center of the wheel are a more significant relative component of the total wind vector thereon, and thus have a greater potential to induce turbulence—and thereby to increase drag.

And as lower surfaces of the wheel are exposed to substantially reduced headwinds, and also contribute much less resistive torque upon the wheel, crosswind-induced turbulence on the lower spokes is a relatively insignificant factor contributing to overall vehicle drag when compared to the upper wheel surfaces. Thus, spoke profiles are best tapered for optimum reduced drag on upper wheel surfaces, rather than for lower wheel surfaces.

As a circular spoke profile generally produces far less drag-inducing turbulence than a flat blade profile when obliquely facing the wind, the portion of the spoke most sensitive to crosswinds should be closer to circular in profile, while the portion of the spoke less sensitive to crosswinds should be closer to a streamlined wing shape in profile. Thus, a tapered spoke—whose profile gradually transitions from thin and streamlined near the rim of the wheel, to more oval or circular near the central hub of the wheel—can reduce the drag on the spoke over a wider range of crosswind conditions than traditional generally constant cross-sectional profile—either bladed or circular—spoke designs.

Eleventh Embodiment—FIGS. 26, 27, 28, 29 and 30

Figure 27:
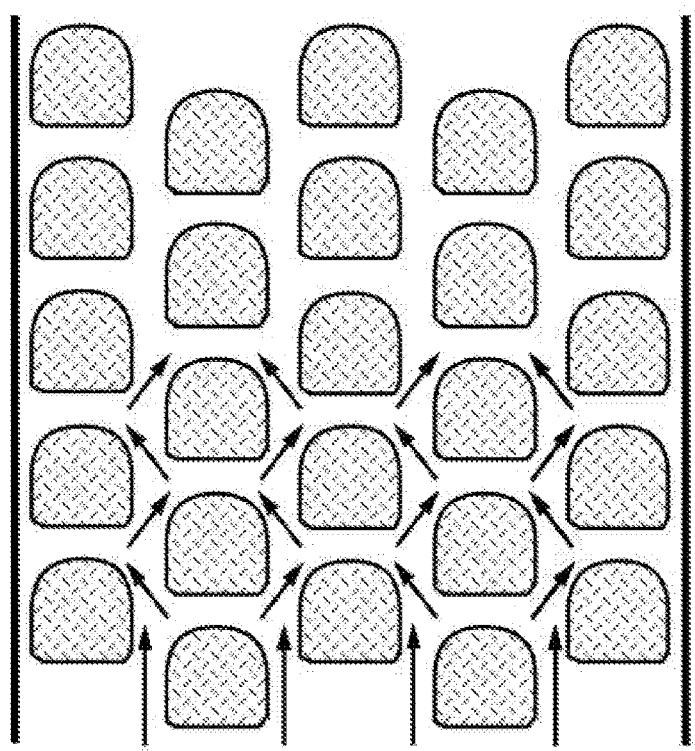
FIG. 27 shows an aerodynamic tread pattern with aggressive tread blocks having relatively sharp, angular, non-aerodynamic windward-facing sides for traction, and more smooth and streamlined leeward-facing sides for minimizing drag. The tread blocks are shown separated and offset longitudinally in order to partially redirect air flowing from the front leading surface of one block toward the rear trailing surface of an adjacent block, thereby reducing pressure drag on the adjacent block.

In FIG. 27, an aggressive tire tread block pattern is shown having tread blocks which taper smoothly in profile on the leeward side, thereby reducing drag. The tread blocks are spaced apart and arranged to permit air displaced by the tread to flow smoothly between, around and over each block, minimizing any flow separation—and thereby turbulence—behind each individual tread block. The relatively sharp, angular windward side of each block thereby provides for aggressive traction for typical off-road vehicle applications. However, the smoother leeward side of each tread block provides substantial streamlining for upper wheel drag reduction.

Tires using these streamlined tread blocks are thereby typically designed for unidirectional rotation, since using these tires in reverse rotation may reduce traction. Forward-facing windward surfaces of the tread blocks are generally sharp and angular in shape, and are thus optimized for maximum traction on slippery ground; while the leeward, rearward-facing surfaces of the tread blocks are streamlined in design in order to reduce drag on each block.

The tread blocks are spaced and arranged to provide sufficient clearances to allow generally minimally restricted air flow there-between, such that air flowing near the top of the tire is deflected substantially between the tread blocks, rather than mostly over the top of the tire. Near the top of the wheel assembly within the forward quadrant, air flowing around one block is largely diverted between the blocks, with minimal diversion of air over the top surface of the block. And tread blocks are generally arranged to direct diverted air largely toward the leeward side of adjacent blocks. In this way, the pressure differential between the windward and leeward surfaces of tread blocks is further minimized, thereby reducing form drag on the tread blocks even more.

With tire tread blocks configured in this way, the tread near the top of tire is substantially streamlined for impinging headwinds. Form drag upon the tread blocks is thereby substantially reduced, both where winds most directly impinge the windward tread block surfaces, and where the fastest moving tread blocks are located—near the top of tire. As discussed above, these uppermost wheel surfaces are also the most critical drag-inducing surfaces retarding vehicle motion and increasing down-forces needed to maintain tire traction at higher speeds. Thus, it becomes crucial to minimize drag on these upper tire tread blocks. And streamlining tread patterns for this location on the wheel assembly is an effective means to improve propulsive efficiency of the vehicle, particularly at higher vehicle speeds.

Various configurations of tread patterns may incorporate streamlined tread blocks for reducing upper wheel drag forces against the tire. Tread blocks may taper either in width, depth or length. Alternative tread block patterns may incorporate more or less streamlined tapered lengths, depending on the application; longer streamlined blocks may reduce the total number of tread blocks available to cover the tire, enhancing drag reduction for higher speed applications at the expense of somewhat reduced tire traction. Contrarily, shorter streamlined blocks may increase the total number of tread blocks available to cover the tire, enhancing tire traction for slower speed applications at the expense of somewhat reduced drag reduction.

Figure 28:
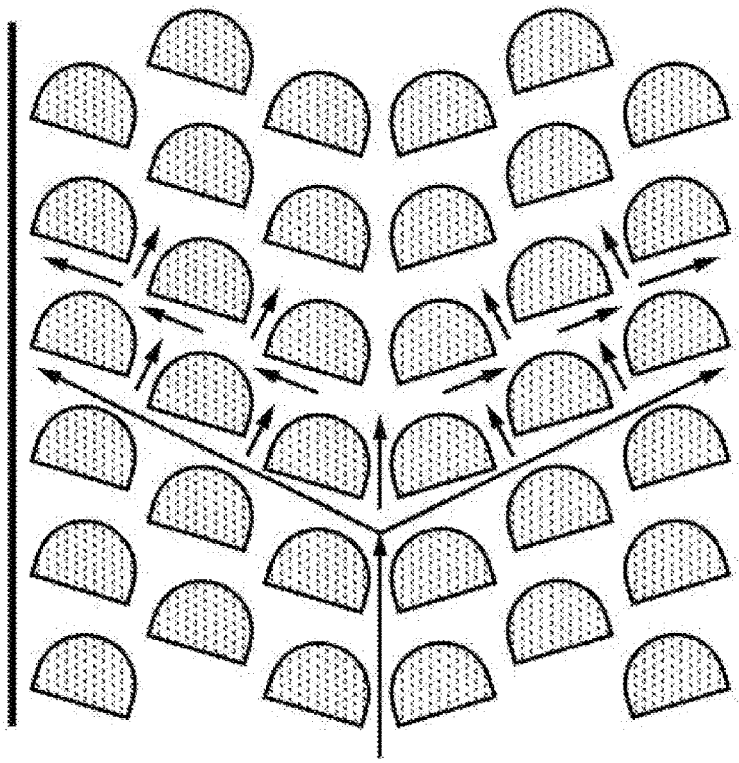
FIG. 28 shows an aerodynamic tread pattern with aggressive tread blocks having relatively sharp, angular, non-aerodynamic windward-facing sides for traction, and more smooth and streamlined leeward-facing sides for minimizing drag. The tread blocks are show separated and offset longitudinally in an oblique arrangement, in order to partially redirect air flowing from the front leading surface of one block toward the rear trailing surface of an adjacent block—thereby reducing pressure drag on the adjacent block—and toward the outside of the tire.
Figure 29:
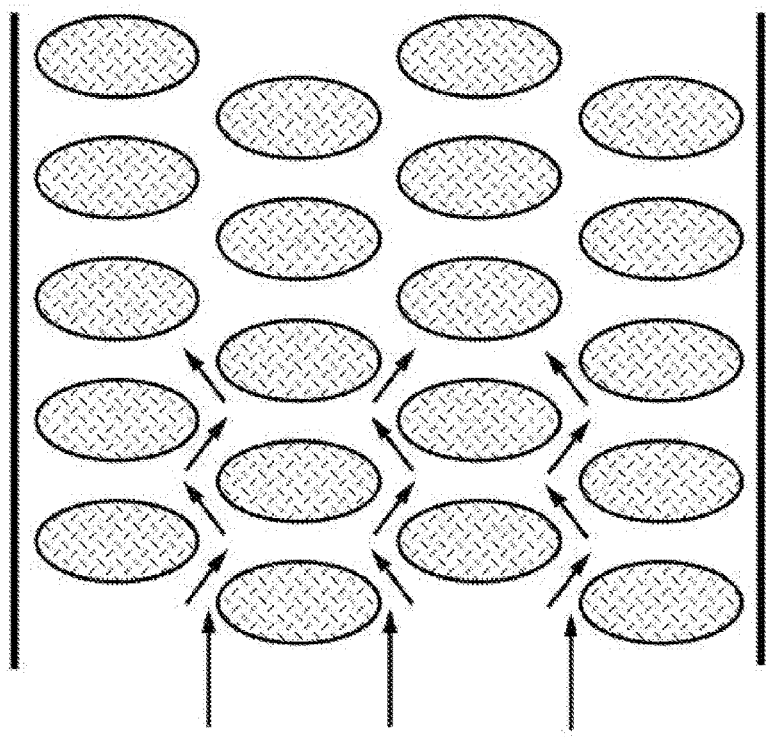
FIG. 29 shows an aerodynamic tread pattern with aggressive tread blocks having oval-shaped tread blocks oriented with wider sides positioned laterally for more traction, while having a substantially streamlined profiles for minimizing drag. Such a symmetrical tread pattern allows for bi-directional mounting on a vehicle. The tread blocks are shown separated and offset sufficiently in order to partially redirect air flowing from the front leading surface of one block toward the rear trailing surface of an adjacent block, thereby reducing pressure drag on the adjacent block.
Figure 30:
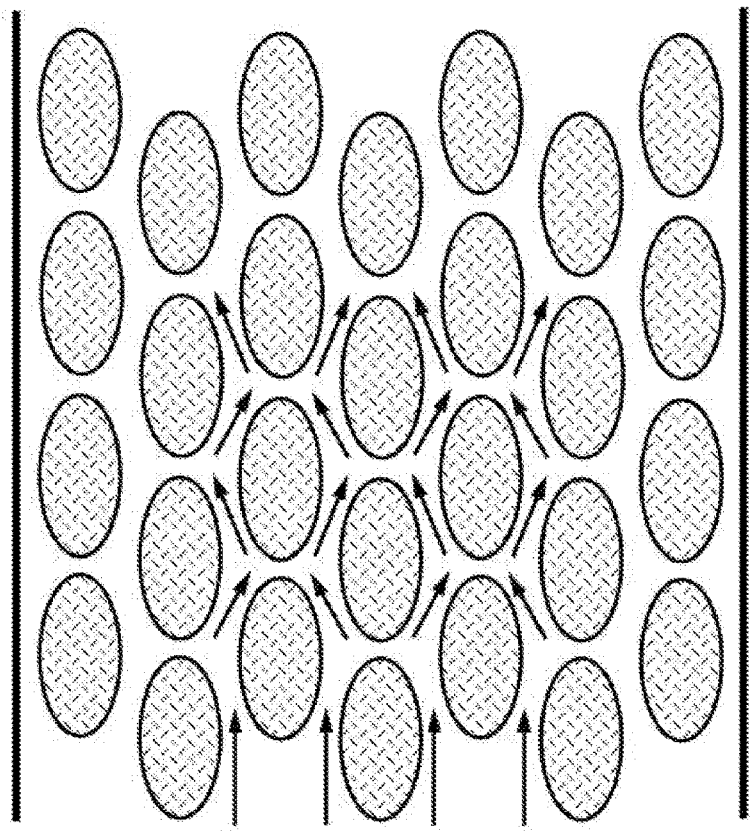
FIG. 30 shows an aerodynamic tread pattern with aggressive tread blocks having oval-shaped tread blocks oriented with wider sides positioned longitudinally for more drag reduction, and having a substantially streamlined profiles for minimizing drag. Such a symmetrical tread pattern allows for bi-directional mounting on a vehicle. The tread blocks are shown separated and offset sufficiently in order to partially redirect air flowing from the front leading surface of one block toward the rear trailing surface of an adjacent block, thereby reducing pressure drag on the adjacent block.

Windward tread block surfaces may also include somewhat oblique patterned arrangements—as shown in FIG. 28—rather than a more parallel orientation to the wheel axle often used to maximize traction. Alternatively, both windward and leeward tread block surfaces may include streamlined designs, with the blocks being more substantially oval in shape; the oval blocks can be shaped either symmetrically-similar from front to back such as in FIGS. 29 and 30, or the windward side can be shaped to be more sharp and angular, with the leeward surface being more streamlined and extended in length. In either case, sufficient clearance between the tread blocks must be maintained in order to enable substantial air flow there-between, and to enable pressure relief behind adjacent tread blocks, thereby minimizing form drag on the blocks. And for each of these embodiments, tread blocks are arranged in an aerodynamically optimized pattern.

And similar to other embodiments, the aerodynamic drag forces exerted upon the upper surfaces of tire are substantially reduced. Thus, this embodiment may offer dramatic reductions in vehicle drag, particularly for faster vehicles with aggressively treaded tires that are exposed directly to headwinds.

Figure 31:
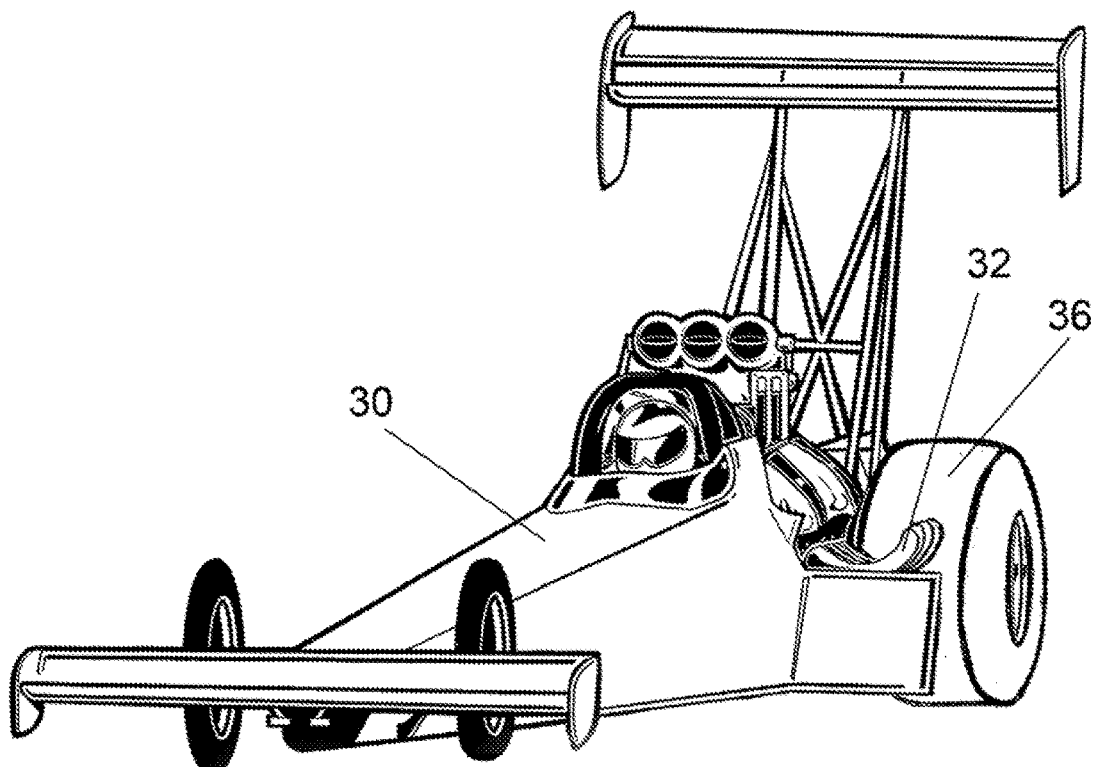
FIG. 31 shows prior art of a typical top-fuel dragster race-car having engine exhaust pipes arranged in a linear array to direct exhaust gases substantially to the outside of the rear wheel assembly.
Figure 32:
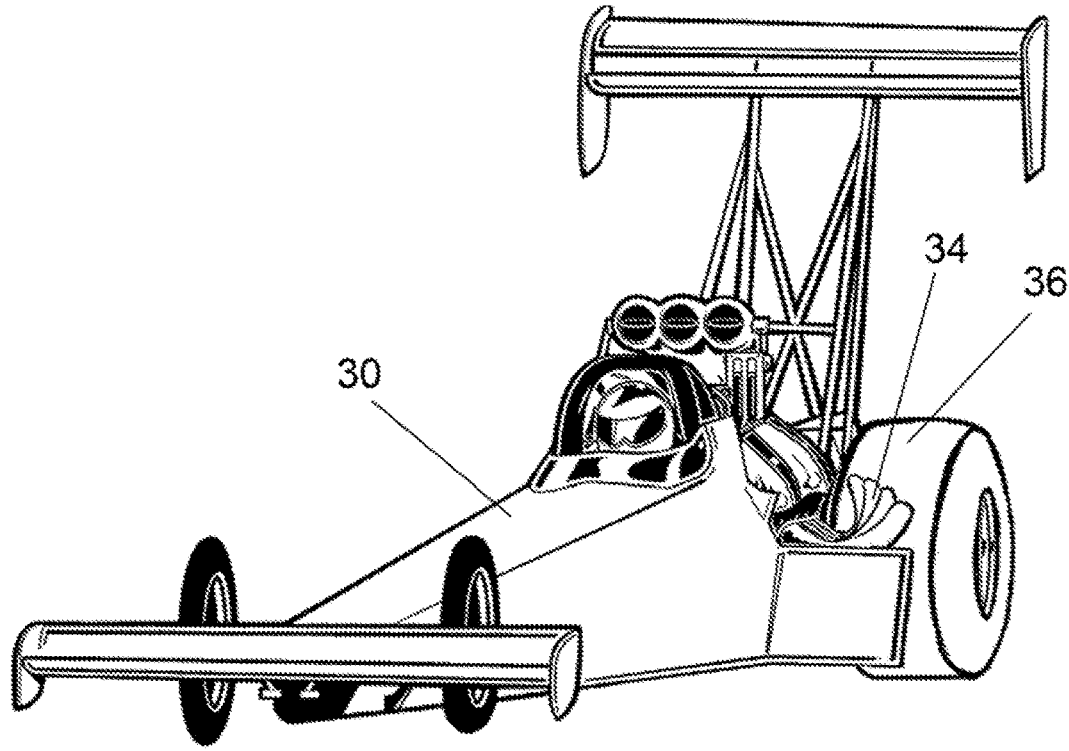
FIG. 32 shows a typical top-fuel dragster race-car having engine exhaust pipes arranged in a distributed array to direct exhaust gases directly above the rear wheel assembly, spanning the zone shielding the entire width of the upper surfaces of the wide tire.

Twelfth Embodiment—Description—FIGS. 31 and 32

As shown in FIG. 32, a wind-deflecting exhaust pipe array 34 is shown on one side of a typical top-fuel dragster race car 30, where the exhaust pipes are directed laterally in a distributed fashion to divert headwinds from directly impinging the upper surfaces of the rearmost exposed tire 36. The extreme velocity of the air emanating from the exhaust pipes is used to deflect the headwinds generally above the uppermost surfaces of the rear tire. Rather than aligning the pipes all in an aligned array 32 with pipes directed mostly upward but substantially toward the outside of the vehicle—as is commonly seen in the racing art as shown in FIG. 31—the pipes in this embodiment are arranged to direct the exhaust upward, but spanning the entire width of the rear tire. Properly positioned for the particular application, the ejected exhaust gases deflect substantial headwinds upward above the rear tire 36.

With the wind-deflecting exhaust pipe array 34 configured in this way, the surfaces near the top of rear tire 36 are substantially shielded from impinging headwinds. And similar to the embodiment of FIG. 6, the aerodynamic drag forces exerted upon the upper surfaces of rear tire 36 are substantially reduced, and may thereby offer dramatic reductions in high speed vehicle drag forces.

Variations on this embodiment are easily envisioned, and could be employed wide variety of more traditional sports cars, automobiles, and motorcycles. For example, exhaust pipes could be directed to exit in the upper forward portion of the fender well, directing exhaust gases sideways out the front of the well, thereby helping to shield the upper wheel surfaces from headwinds.

Advantages

From the description above, a number of advantages of some embodiments become evident:
(a) The addition of simple upper wheel fairings to a bicycle can improve rider propulsive efficiency—especially in headwinds—without compromising rider comfort, significantly increasing wheel expense or decreasing wheel durability.
(b) The addition of simple upper wheel fairings to an electric bicycle powered by rechargeable batteries can improve motor propulsive efficiency, especially in headwinds, extending the effective range of such power-assisted bicycles.
(c) The addition of simple upper wheel fairings to a motorcycle can improve propulsive efficiency—especially in headwinds—yielding greater fuel economy.
(d) The addition of simple upper wheel fairings to certain automobiles having otherwise exposed tires, such as jeep-type vehicles with elevated suspensions, can improve propulsive efficiency—especially in headwinds—yielding greater fuel economy.
(e) The addition of simple upper wheel fairings to certain truck and trailer wheels having otherwise exposed tires can improve propulsive efficiency—especially in headwinds—yielding greater fuel economy.
(f) The addition of simple upper wheel fairings to a bicycle or motorcycle can reduce the down-force needed to ensure cycle stability—especially important when navigating curved roads under wet conditions—thus also better sustaining cornering traction during intermittent wind gusts, and thereby improving cyclist safety.
(g) The addition of simple upper wheel fairings to certain high-speed vehicles having otherwise exposed tires can reduce the down-force needed to ensure vehicle stability. Reducing down-force in turn reduces the need for drag-inducing wings. In addition, reducing down-force results in reduced tire rolling resistance and bearing friction. These factors thereby improve propulsive efficiency—especially in headwinds—yielding greater fuel economy.
(h) The use of streamlined spokes in automotive wheels—especially in wheels used in certain high-speed vehicles having otherwise exposed spokes—can reduce both drag on the upper wheel and consequently the down-force needed to ensure vehicle stability, and thereby improve propulsive efficiency and vehicle safety—especially in headwinds—yielding greater fuel economy.
(i) The use of axially offset streamlined spokes in automotive wheels—especially in wheels used in certain high-speed vehicles having otherwise exposed spokes—can reduce both drag on the upper wheel and consequently the down-force needed to ensure vehicle stability, while maintaining the axial strength of the wheel. This in turn can improve propulsive efficiency and vehicle safety—especially in headwinds—yielding greater fuel economy.
(j) The use of streamlined spoke tailfins in cycle wheels—especially in wheels having otherwise exposed spokes—can reduce both drag on the upper wheel and consequently and the down-force needed to ensure vehicle stability, and thereby improve propulsive efficiency and cycle safety, especially in headwinds.
(k) The use of variably-tapered spokes in cycle wheels, where the spokes are tapered from a streamlined profile near the rim to more oval or circular profile near the wheel hub can reduce both drag on the upper wheel and consequently the down-force needed to ensure cycle stability, and thereby improve propulsive efficiency and cycle safety—especially in headwinds—over a wide range of crosswind conditions.
(l) The use of tires having streamlined tread blocks arranged in an optimal aerodynamic pattern can reduce both drag on the upper wheel and consequently the down-force needed to ensure vehicle stability, and thereby improve propulsive efficiency and vehicle safety—especially in headwinds—yielding greater fuel economy.
(m) The use of vehicle engine exhaust pipes arranged in an optimal pattern to direct exhaust gases to deflect headwinds from otherwise impinging upper wheel surfaces can reduce both drag on the upper wheel and consequently the down-force needed to ensure vehicle stability, and thereby improve propulsive efficiency and vehicle safety—especially in headwinds—yielding greater fuel economy.

CONCLUSIONS, RAMIFICATIONS, AND SCOPE

Exposed wheels can generate considerable drag forces on a moving vehicle. These forces are directed principally near the top of the wheel, rather than being more evenly distributed across the entire profile of the wheel. Moreover, these upper-wheel drag forces are levered against the axle, thereby magnifying the counterforce required to propel the vehicle. As a result, a reduction in drag upon the upper wheel generally enhances propulsive efficiency significantly more than a corresponding drag reduction on other parts of the vehicle.

With the net drag forces being offset and directed near the top of the wheel, nearly equivalent countervailing reaction forces—also opposing vehicle motion—are necessarily transmitted to the wheel at the ground. These reaction forces necessitate augmented down-forces to be applied in higher speed vehicles, in order to maintain static frictional ground contact and, thereby, vehicle traction and directional stability. As wings and other means typically used to augment these down-forces in such vehicles can add significant drag, it becomes evident that substantial effort should be made to reduce the upper wheel drag forces on most high-speed vehicles.

Modern automobile wheels, particularly those designed for use with low-profile tires typically found on expensive sports cars, often include narrow spoke sections connecting the hub and rim, which become significant sources of drag. Recent automotive design innovation on sports cars has focused on reducing upper-body drag while simultaneously increasing down-forces to maintain traction. However, the wheel spokes typically used remain configured with inefficient drag profiles, and are often located on the outside of the wheel assembly, where they can be more directly exposed to headwinds. These spokes often have generally rectangular cross-sectional profiles, which present significantly increased sensitivity to drag forces upon the upper wheel, and thereby upon the vehicle.

An embodiment includes the use of aerodynamic profiles on the spokes of automotive wheels, designed to minimize drag. By shaping the spokes in an oval cross-sectional profile with a two-to-one dimensional ratio, for example, the drag sensitivity can generally be reduced by a factor of two or three times over a corresponding square-profile spoke design. Further narrowing of the streamlined profile can reduce drag sensitivity of the spokes even more. Given the magnifying property of upper wheel drag forces to increasing both the down-forces needed to maintain vehicle traction and the overall drag upon the vehicle, configuring exposed spokes for minimal drag can be particularly helpful to improving vehicle propulsive efficiency, especially for the outermost spokes and for wheel sections nearest the rim which are most exposed to headwinds.

Drag can be reduced on the narrow round spokes of bicycle wheels, by simply adding a streamlined tailfin section to the leeward side of the spoke. By enabling the streamlined tailfin to swivel about the spoke in response to varying crosswinds, drag can be minimized over a variety of crosswind conditions over the full range of wheel rotation. And several tailfins of varying configurations can be used in combination to optimize drag on the spoke, in response to variable crosswinds along the length of the spoke on the upper wheel.

Alternatively, drag can be reduced on the bladed spokes of bicycle wheels, by simply by tapering the blade of the spoke at the rim to a more round profile at the wheel hub. By tailoring the profile of the spoke to accommodate the range of crosswind components—which vary in magnitude from the rim to the hub—drag can be minimized on the spoke over a variety of crosswind conditions. Moreover, the tailfin could also be adapted with a similar variable cross-sectional profile along its length in order to minimize drag on the spoke under crosswind conditions.

Furthermore, wider tires with aggressive tread patterns, designed for maximizing traction rather than minimizing drag, contribute to significant drag in many off-road type vehicles. Such tires often have tread patterns with rectangular profiles, which thus suffer higher sensitivities to drag. These tires can be designed with more aerodynamic tread patterns, with the tread blocks shaped either more in an oval shape than a square or rectangular, or more tapered and streamlined on the leeward sides, thereby maintaining much of the traction of the rectangular profile tread tire. Furthermore, designing the gaps between the tread blocks for streamlined flow of headwinds around these tread blocks, could improve vehicle propulsive efficiencies. Moreover, the tread blocks could be shaped to freely divert some of the headwind to the side of the tire, especially for the upper forward profile section of the tire, rather than simply forcing the air up and over the tire, producing additional turbulence and more drag.

And as has been shown, the addition of minimal upper- and forwardly-oriented fairing and fender assemblies can substantially reduce total drag on the wheel, thereby enhancing the propulsive efficiency of the vehicle. Such shielding devices should see widespread application on a range of different vehicles, from human-powered bicycles to high-speed motorcycles, automobiles, and trucks and trailers. The embodiments shown are poised to contribute not only to improved vehicle propulsive efficiency, but also to the worldwide effort to reduce vehicle fuel consumption—and thereby to conserve valuable energy resources.

While the embodiments shown illustrate application generally to front-wheel assemblies on various vehicles, the embodiments could be similarly applied to the rear or intermediate wheels of any wheeled vehicle or vehicle trailer. And while the embodiments illustrated demonstrate shielding applied primarily to the front-most section of upper wheel assemblies, such shields may be extended to closely cover the entire upper half of wheels, especially where enhanced streamlining is desired and sensitivity to crosswinds is not important, as can often be the case for powered cycles and motor vehicles. Accordingly, the embodiments should not be limited to the specific examples illustrated and described above, but rather to the appended claims and their legal equivalents.

I claim:

1. A combination of an open-wheel terrestrial vehicle that has at least two wheels with a wheel otherwise exposed to an oncoming headwind impinging substantially unimpeded thereon above a midmost level of an axle of the otherwise exposed wheel while the vehicle is in forward motion and a wind-shielding fairing for reducing overall drag on the vehicle, with said oncoming headwind consisting of an upper wind and a lower wind, and with said upper wind consisting of headwinds impinging on said wheel above the midmost level and said lower wind consisting of headwinds impinging on said wheel below the midmost level, wherein:
   the vehicle has not more than four wheels;
   the vehicle has either no or not more than a single additional lateral axis centered through any wheeled axle of the vehicle that is positioned wholly forward of the otherwise exposed wheel when the vehicle is arranged for straight forward motion;
   the wind-shielding fairing diverts only the upper wind of the oncoming headwind;
   the wind-shielding fairing diverts only an uppermost portion of the upper wind;
   the uppermost portion of the upper wind is located wholly above a first intermediate elevation above the bottom of the otherwise exposed wheel equal to 60 percent of the diameter of said wheel;
   the wind-shielding fairing diverts the uppermost portion of the upper wind from otherwise impinging substantially unimpeded on a mid-level portion of an otherwise exposed major upper drag-inducing surface of the otherwise exposed wheel, with the major upper drag-inducing wheel surface being located wholly above the first intermediate elevation, with the mid-level portion being centered about a critical elevation that is itself centered in elevation about the major upper drag-inducing wheel surface, and with the major upper drag-inducing wheel surface comprising a primary vehicle-drag-inducing portion of the otherwise exposed wheel located forward of the axle above the first intermediate elevation;

the critical elevation is positioned not lower than a second intermediate elevation above the bottom of the otherwise exposed wheel equal to 80 percent of the diameter of said wheel;

the otherwise exposed wheel is disposed on a forwardmost wheel of the vehicle, said forwardmost wheel being any said wheel not preceded immediately ahead by another wheel disposed both in-line therewith and in sufficient proximity thereto wherein said immediately preceding wheel would thereby divert the uppermost portion of the upper wind from otherwise impinging substantially unimpeded on a forward-facing upper circumferential wheel surface positioned at the critical elevation; and the wind-shielding fairing diverts not more than a minimally sufficient lowermost portion of the uppermost portion of the upper wind otherwise impinging on wheel surfaces located below the second intermediate elevation to thereby reduce overall vehicle drag below a standard amount when the vehicle is operated at a normal highway speed under null wind conditions, with the normal highway speed for the vehicle being the lesser of 75 percent of the maximum operating speed thereof or 65 mph, and with the standard amount being the overall vehicle drag without the fairing in said combination when the vehicle is operated at the normal highway speed under null wind conditions, whereby the wind-shielding fairing otherwise diverting any more of said uppermost portion of the upper wind would instead increase overall vehicle drag above the standard amount when the vehicle is operated at the normal highway speed under null wind conditions.

2. The vehicle-fairing combination of claim 1, wherein the wind-shielding fairing diverts not more than a minimally sufficient lowermost portion of the uppermost portion of the upper wind otherwise impinging on wheel surfaces located below the critical elevation to thereby minimize overall vehicle drag to a minimal amount when the vehicle is operated at the normal highway speed under null wind conditions, with the minimal amount being that at which the wind-shielding fairing otherwise diverting either any more or any less of said uppermost portion of the upper wind would instead increase overall vehicle drag above said minimal amount when the vehicle is operated at the normal highway speed under null wind conditions.

3. The vehicle-fairing combination of claim 1, further comprising:
wherein the vehicle has either two or four wheels; and
wherein the otherwise exposed wheel is a front wheel of the vehicle.

4. The vehicle-fairing combination of claim 3, wherein the vehicle is a motor vehicle with precisely four wheels.

5. The vehicle-fairing combination of claim 4, wherein the wind-shielding fairing diverts not more than a minimally sufficient lowermost portion of the uppermost portion of the upper wind otherwise impinging on wheel surfaces located below the critical elevation to thereby minimize overall vehicle drag to a minimal amount when the vehicle is operated at the normal highway speed under null wind conditions, with the minimal amount being that at which the wind-shielding fairing otherwise diverting either any more or any less of said uppermost portion of the upper wind would instead increase overall vehicle drag above said minimal amount when the vehicle is operated at the normal highway speed under null wind conditions.

6. The vehicle-fairing combination of claim 1, further comprising:
wherein the vehicle has either two or four wheels; and
wherein on each otherwise exposed lateral side of the otherwise exposed wheel the wind-shielding fairing diverts the uppermost portion of the upper wind from otherwise impinging on a central forward portion of the respective major upper drag-inducing wheel surface, with said central forward portion comprising a lowermost portion of said respective major upper drag-inducing wheel surface that is both centrally located radially inside the tire and positioned forward of the axle and below the critical elevation.

7. The vehicle-fairing combination of claim 6, wherein the vehicle is a cycle with precisely two wheels.

8. The vehicle-fairing combination of claim 7, wherein the vehicle is a bicycle.

9. The vehicle-fairing combination of claim 1, wherein the vehicle is an electric vehicle.

10. The vehicle-fairing combination of claim 3, wherein the vehicle is an electric vehicle.

11. The vehicle-fairing combination of claim 6, wherein the vehicle is an electric vehicle.

12. The vehicle-fairing combination of claim 8, further comprising:
wherein the otherwise exposed wheel is a front wheel of the vehicle; and
wherein the wind-shielding fairing diverts not more than a minimally sufficient lowermost portion of the uppermost portion of the upper wind otherwise impinging on wheel surfaces located below the critical elevation to thereby reduce overall vehicle drag below a standard amount when the vehicle is operated at the normal highway speed under null wind conditions, with the normal highway speed for the vehicle being 20 mph, and with the standard amount being the overall vehicle drag without the fairing in said vehicle-fairing combination when the vehicle is operated at the normal highway speed under null wind conditions,
whereby the wind-shielding fairing otherwise diverting any more of said uppermost portion of the upper wind would instead increase overall vehicle drag above the standard amount when the vehicle is operated at the normal highway speed under null wind conditions.

13. A wind-diverting apparatus reducing drag on a terrestrial vehicle that has a wheel otherwise exposed to a vehicle headwind impinging substantially unimpeded above a midmost level of an axle of the wheel upon a forward-facing upper circumferential surface of a tire of the wheel, said upper circumferential tire surface positioned above the midmost level, and the vehicle having either no or not more than a single additional lateral axis centered through any wheeled axle of the vehicle that is positioned wholly forward of the otherwise exposed wheel when the vehicle is arranged for straight forward motion, wherein said apparatus comprises:
an upper wheel wind-shielding assembly attached to a nonrotatable structural member of the vehicle;
the wind-shielding assembly configured wherein any headwind-exposed portion of the wind-shielding assembly that is arranged to shield a surface of the wheel located no closer to the center of the axle than an intermediate radial distance equal to one-third the diameter of the wheel from headwinds otherwise impinging thereon, said headwind-exposed portion being disposed wholly above a lowermost level located above the midmost level of the axle;

a circumferential fendered portion of the wind shielding assembly, wherein said circumferential fendered portion consists of wind-deflecting surfaces of the wind-shielding assembly that are aligned immediately adjacent to respective circumferential surfaces of the tire;

the circumferential fendered portion disposed immediately adjacent to a forward-facing upper circumferential tire surface located no higher than an upper level positioned above the bottom of the wheel a distance equal to 85 percent of the diameter of the wheel;

the circumferential fendered portion extending forward and downward to not lower than a forwardmost level that is positioned above the midmost level of the axle;

the wind-shielding assembly furthermore configured to have a radially outer sidewall-aligned fairing portion consisting of wind-shielding fairing surfaces that are wholly aligned immediately adjacent to respective outer sidewall surfaces of the wheel, wherein said outer sidewall wheel surfaces consist of respective lateral sidewall surfaces of the tire and of an outer circular rim of the wheel that are wholly positioned anywhere between the intermediate radial distance from the center of the axle and an outer radial distance from the center of the axle equal to 47.5 percent of the diameter of the wheel;

the wind-shielding assembly furthermore configured wherein any said outer sidewall-aligned fairing portion located rearward of the center of the axle extends no lower than the midmost level; and the wind-shielding assembly furthermore configured wherein any said outer sidewall-aligned fairing portion located rearward of the center of the axle furthermore extends no lower than any wind-shielding fairing surfaces of the wind-shielding assembly wholly located both rearward of the center of the axle and no further rearward from center of the axle than the intermediate radial distance.

14. The apparatus of claim 13, wherein, further:
the vehicle has either two or four wheels;
the lowermost level is positioned no lower than an elevation above the bottom of the wheel equal to 60 percent of the diameter of the wheel; and
the forwardmost level is positioned no lower than an elevation above the bottom of the wheel equal to 60 percent of the diameter of the wheel.

15. The apparatus of claim 14, wherein, further:
the wheel is a front wheel of the vehicle;
the wind-shielding assembly extends rearward of the center of the axle;
the forwardmost level is positioned no lower than an elevation above the bottom of the wheel equal to 67 percent of the diameter of the wheel; and
the circumferential fendered portion of the wind-shielding assembly is disposed adjacent to a forward-facing upper circumferential tire surface positioned lower in elevation than the top of the wheel rim.

16. The apparatus of claim 14, wherein, further:
the vehicle is a cycle with precisely two wheels.

17. The apparatus of claim 14, wherein, further:
the wind-shielding assembly comprises an upper forward portion of a radially inner sidewall-aligned fairing portion, said upper forward portion consisting of wind-shielding fairing surfaces aligned immediately adjacent to respective inner surfaces of the wheel located wholly forward of the center of the axle and no further from the center of the axle than the intermediate radial distance;
the upper forward portion of the radially inner sidewall-aligned fairing portion is disposed wholly above the midmost level of the axle; and
each otherwise exposed lateral side of the wheel has one said upper forward portion disposed immediately adjacent thereto.

18. The apparatus of claim 17, wherein, further:
the wheel is a front wheel of the vehicle.

19. The apparatus of claim 18, wherein, further:
the vehicle is an electric vehicle.

20. The apparatus of claim 15, wherein, further:
the vehicle is a cycle with precisely two wheels.

21. The apparatus of claim 20, wherein, further:
the vehicle is an electric vehicle.

22. The apparatus of claim 19, wherein, further:
the vehicle is an electric vehicle.

23. The apparatus of claim 19, wherein, further:
the vehicle is a bicycle.

24. The apparatus of claim 23, wherein, further:
the vehicle is an electric vehicle.

25. The apparatus of claim 17, wherein, further:
the vehicle is a cycle with precisely two wheels.

26. The apparatus of claim 25, wherein, further:
the vehicle is an electric vehicle.

27. The apparatus of claim 17, wherein, further:
the forwardmost level is positioned no lower than an elevation above the bottom of the wheel equal to 67 percent of the diameter of the wheel; and
the circumferential fendered portion of the wind-shielding assembly is disposed adjacent to a forward-facing upper circumferential tire surface positioned lower in elevation than the top of the wheel rim.

28. The apparatus of claim 17, wherein, further:
the vehicle is a motor vehicle with precisely four wheels.

29. The apparatus of claim 13, wherein, further:
the wheel is a front wheel of the vehicle;
the vehicle has either two or four wheels; and
the vehicle is an electric vehicle.

30. The apparatus of claim 29, wherein, further:
the lowermost level is positioned no lower than an elevation above the bottom of the wheel equal to 60 percent of the diameter of the wheel; and
the forwardmost level is positioned no lower than an elevation above the bottom of the wheel equal to 60 percent of the diameter of the wheel.

31. A method for reducing drag on a terrestrial vehicle that has a wheel otherwise exposed to a vehicle headwind impinging substantially unimpeded above a midmost level of a axle of the wheel upon a forward-facing upper circumferential surface of a tire of the wheel, said upper circumferential tire surface positioned above the midmost level, and the vehicle having either no or not more than a single additional lateral axis centered through any wheeled axle of the vehicle that is positioned wholly forward of the otherwise exposed wheel when the vehicle is arranged for straight forward motion, wherein said method comprises:
forming an aerodynamic upper wheel wind-shielding assembly attached to a nonrotatable structural member of the vehicle wherein the wind-shielding assembly comprises:
the wind-shielding assembly configured wherein any headwind-exposed portion of the wind-shielding assembly that is arranged to shield a surface of the wheel located no closer to the center of the axle than an intermediate radial distance equal to one-third the diameter of the wheel from headwinds otherwise impinging thereon, said headwind-exposed portion being disposed wholly above a lowermost level located above the midmost level of the axle;

a circumferential fendered portion of the wind shielding assembly, wherein said circumferential fendered portion consists of wind-deflecting surfaces of the wind-shielding assembly that are aligned immediately adjacent to respective circumferential surfaces of the tire;

the circumferential fendered portion disposed immediately adjacent to a forward-facing upper circumferential tire surface located no higher than an upper level positioned above the bottom of the wheel a distance equal to 85 percent of the diameter of the wheel;

the circumferential fendered portion extending forward and downward to not lower than a forwardmost level that is positioned above the midmost level of the axle;

the wind-shielding assembly furthermore configured to have a radially outer sidewall-aligned fairing portion consisting of wind-shielding fairing surfaces that are aligned immediately adjacent to respective outer sidewall surfaces of the wheel, wherein said outer sidewall wheel surfaces consist of respective lateral sidewall surfaces of the tire and of an outer circular rim of the wheel that are wholly positioned anywhere between the intermediate radial distance from the center of the axle and an outer radial distance from the center of the axle equal to 47.5 percent of the diameter of the wheel;

the wind-shielding assembly furthermore configured wherein any said outer sidewall-aligned fairing portion located rearward of the center of the axle extends no lower than the midmost level; and the wind-shielding assembly furthermore configured wherein any said outer sidewall-aligned fairing portion located rearward of the center of the axle furthermore extends no lower than any wind-shielding fairing surfaces of the wind-shielding assembly wholly located both rearward of the center of the axle and no further rearward from center of the axle than the intermediate radial distance;

and configuring the wind-shielding assembly to be limited in drag-inducing extended disposition so that when the vehicle is operated at a normal highway speed under null wind conditions any further increase in the extended disposition of the wind-shielding assembly would further increase drag induced thereon to cause overall vehicle drag to increase above a standard amount otherwise induced when the wind-shielding assembly is otherwise absent from the vehicle, said normal highway speed being equal to 75 percent of the maximum operating speed of the vehicle, whereby any reduction in vehicle drag from reduced drag on the wheel is not less than the offsetting respective vehicle drag induced by the wind-shielding assembly itself.

32. The method of claim 31, wherein, further:
the vehicle has either two or four wheels;
the lowermost level is positioned no lower than an elevation above the bottom of the wheel equal to 60 percent of the diameter of the wheel; and
the forwardmost level is positioned no lower than an elevation above the bottom of the wheel equal to 60 percent of the diameter of the wheel.

33. The method of claim 32, wherein, further:
the wheel is a front wheel of the vehicle;
the wind-shielding assembly extends rearward of the center of the axle;
the forwardmost level is positioned no lower than an elevation above the bottom of the wheel equal to 67 percent of the diameter of the wheel; and
the circumferential fendered portion of the wind-shielding assembly is disposed adjacent to a forward-facing upper circumferential tire surface positioned lower in elevation than the top of the wheel rim.

34. The method of claim 32, wherein, further:
the vehicle is a cycle with precisely two wheels.

35. The method of claim 32, wherein, further:
the wind-shielding assembly comprises an upper forward portion of a radially inner sidewall-aligned fairing portion, said upper forward portion consisting of wind-shielding fairing surfaces aligned immediately adjacent to respective inner surfaces of the wheel located wholly forward of the center of the axle and no further from the center of the axle than the intermediate radial distance;
the upper forward portion of the radially inner sidewall-aligned fairing portion is disposed wholly above the midmost level of the axle; and
each otherwise exposed lateral side of the wheel has one said forward inner sidewall-aligned fairing portion disposed immediately adjacent thereto.

36. The method of claim 35, wherein, further:
the wheel is a front wheel of the vehicle.

37. The method of claim 36, wherein, further:
the vehicle is an electric vehicle.

38. The method of claim 33, wherein, further:
the vehicle is a cycle with precisely two wheels.

39. The method of claim 38, wherein, further:
the vehicle is an electric vehicle.

40. The method of claim 37, wherein, further:
the vehicle is an electric vehicle.

41. The method of claim 37, wherein, further:
the vehicle is a bicycle.

42. The method of claim 41, wherein, further:
the vehicle is an electric vehicle.

43. The method of claim 35, wherein, further:
the vehicle is a cycle with precisely two wheels.

44. The method of claim 43, wherein, further:
the vehicle is an electric vehicle.

45. The method of claim 35, wherein, further:
the forwardmost level is positioned no lower than an elevation above the bottom of the wheel equal to 67 percent of the diameter of the wheel; and
the circumferential fendered portion of the wind-shielding assembly is disposed adjacent to a forward-facing upper circumferential tire surface positioned lower in elevation than the top of the wheel rim.

46. The method of claim 35, wherein, further:
the vehicle is a motor vehicle with precisely four wheels.

47. The method of claim 31, wherein, further:
the wheel is a front wheel of the vehicle;
the vehicle has either two or four wheels; and
the vehicle is an electric vehicle.

48. The method of claim 47, wherein, further:
the lowermost level is positioned no lower than an elevation above the bottom of the wheel equal to 60 percent of the diameter of the wheel; and the forwardmost level is positioned no lower than an elevation above the bottom of the wheel equal to 60 percent of the diameter of the wheel.

49. The method of claim 31, wherein, further:

the vehicle has either two or four wheels; and arranging the wind-shielding assembly to be optimally configured in extended disposition so that when the vehicle is operated at the normal highway speed under null wind conditions any further increase or any further decrease in the extended disposition of the wind-shielding assembly would increase overall vehicle drag above a minimal amount otherwise induced when the wind-shielding assembly is optimally configured in extended disposition on the vehicle.

* * * * *